US012573846B1

(12) United States Patent
Chang et al.

(10) Patent No.: US 12,573,846 B1
(45) Date of Patent: Mar. 10, 2026

(54) DETECTION METHOD AND APPARATUS FOR INVERTER SYSTEM AND INVERTER SYSTEM

(71) Applicant: SIGENERGY TECHNOLOGY CO., LTD., Shanghai (CN)

(72) Inventors: Hao Chang, Shanghai (CN); Pengfei He, Shanghai (CN); Xinkang Bao, Shanghai (CN)

(73) Assignee: SIGENERGY TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 19/237,048

(22) Filed: Jun. 13, 2025

(30) Foreign Application Priority Data

Oct. 28, 2024 (CN) .......................... 202411508636.7

(51) Int. Cl.
H02J 3/00 (2006.01)
H02H 1/00 (2006.01)
(Continued)

(52) U.S. Cl.
CPC ........... H02J 3/001 (2020.01); H02H 1/0015 (2013.01); H02J 3/381 (2013.01); H02S 40/32 (2014.12); H02S 50/10 (2014.12); H02J 2300/26 (2020.01)

(58) Field of Classification Search
CPC ........ H02J 3/001; H02J 3/381; H02J 2300/26; H02H 1/0015; H02S 40/32; H02S 50/10
See application file for complete search history.

(56) References Cited

U.S. PATENT DOCUMENTS

2013/0307343 A1    11/2013   Behrends et al.
2020/0076364 A1*   3/2020    Poyil .................. G01R 31/1227
(Continued)

FOREIGN PATENT DOCUMENTS

CN        108333491 A      7/2018
CN        114755546 A      7/2022
(Continued)

OTHER PUBLICATIONS

First Office Action from corresponding Chinese Application No. 202411508636.7, dated Jan. 4, 2025. English translation attached.
(Continued)

*Primary Examiner* — Michael Y Sun

(57) ABSTRACT

The present disclosure discloses a detection method and apparatus for an inverter system and an inverter system. The detection method includes: obtaining output power corresponding to a target system connected to at least one load, where the target system is configured to supply power to the at least one load, and the target system includes a photovoltaic system; and performing arc detection on a faulty photovoltaic string in the photovoltaic system based on the output power and total power corresponding to the at least one load. The detection method for the inverter system of the present disclosure ensures stability of load operation during an arc detection process, mitigates an impact of a reduction in output power of the inverter system on the load operation, improves load performance and prolongs a service life of the load, reduces safety hazards caused by unstable operation of the load, and improves user experience.

19 Claims, 10 Drawing Sheets

Obtaining output power corresponding to a target system connected to the at least one load, wherein the target system is configured to supply power to the at least one load, and wherein the target system includes the photovoltaic system ⟋ 110

Performing arc detection on a faulty photovoltaic string in the photovoltaic system based on the output power and total power corresponding to the at least one load ⟋ 120

(51) Int. Cl.
  H02J 3/001 (2026.01)
  H02J 3/38 (2006.01)
  H02S 40/32 (2014.01)
  H02S 50/10 (2014.01)

(56) References Cited

U.S. PATENT DOCUMENTS

| | | | |
|---|---|---|---|
| 2020/0326385 A1* | 10/2020 | Liu | H02H 7/20 |
| 2022/0190598 A1 | 6/2022 | Azzolini et al. | |
| 2023/0071656 A1* | 3/2023 | Liu | H02S 40/32 |

FOREIGN PATENT DOCUMENTS

| | | |
|---|---|---|
| CN | 219717944 U | 9/2023 |
| EP | 3367526 A1 | 8/2018 |

OTHER PUBLICATIONS

The Grant Notice from corresponding Chinese Application No. 202411508636.7, dated Feb. 21, 2025. English translation attached.
Yang, Hao. "Power Control Algorithm of Single-Phase Cascaded H-Bridge Inverter", Full text of outstanding master's degree theses in China Database Engineering Technology II, Jul. 31, 2021 (Jul. 31, 2021), C042-377.
Matthew Rylander. "Apparatus and Procedure for Calculating Short-Circuit Impedance to Determine Bus Fault Currents and Smart Inverter Settings", IEEE Power and Energy Society General Meeting, Aug. 31, 2020 (Aug. 31, 2020), full text.
Extended European Search Report dated Jan. 7, 2026 received in corresponding European Application No. EP25182839.8.

* cited by examiner

1410

1420

First processing module  ········  Second processing module

Electronic device

1501

1502

Processor  ⟺  Memory

FIG. 15

DETECTION METHOD AND APPARATUS FOR INVERTER SYSTEM AND INVERTER SYSTEM

CROSS-REFERENCES TO RELATED APPLICATIONS

This application claims priority to Chinese Patent Application No. 202411508636.7 filed on Oct. 28, 2024, the entire disclosure of which are incorporated herein by reference.

FIELD

The present disclosure belongs to the technical field of inverter systems, and in particular, relates to a detection method and apparatus for an inverter system and an inverter system.

BACKGROUND

When an inverter system operates in off-grid mode, an arc may be generated due to poor contact between a photovoltaic string in a photovoltaic system and the inverter system, wiring fracture, and other reasons. In the related art, methods for detecting whether an arc is generated may has false detection issues. Moreover, during an arc detection process, a reduction in power on a current-current side easily occurs, resulting in a reduction in output power of the inverter system, making it impossible to support stable operation of a load. This affects performance and a service life of the load, and has safety hazards, affecting user experience.

SUMMARY

The present disclosure aims to at least solve one of the technical problems in the related art. To this end, the present disclosure provides a detection method and apparatus for an inverter system and an inverter system, which ensures stability of load operation during an arc detection process, mitigates an impact of a reduction in output power of the inverter system on the load operation, improves load performance and prolongs a service life of a load, reduces safety hazards caused by unstable operation of the load, and improves user experience.

In a first aspect, the present disclosure provides a detection method for an inverter system. The inverter system is electrically connected to a photovoltaic system and at least one load. The photovoltaic system includes at least one photovoltaic string. The method includes: obtaining output power corresponding to a target system connected to the at least one load, where the target system is configured to supply power to the at least one load, and the target system includes the photovoltaic system; and performing arc detection on a faulty photovoltaic string in the photovoltaic system based on the output power and total power corresponding to the at least one load.

According to the detection method for the inverter system of the present disclosure, the output power of the target system that supplies power to the at least one load is obtained, and the arc detection is performed based on the output power and the total power corresponding to the at least one load, which ensures the stability of the load operation during the arc detection process, mitigates the impact of the reduction of the output power of the inverter system on the load operation, improves the load performance and prolongs the service life of the load, and reduces the safety hazards caused by the unstable operation of the load, and improves the user experience.

According to the detection method for the inverter system of the present disclosure, when the target system further includes at least one of an energy storage system and a power output system, the output power corresponding to the target system is a sum of maximum output power corresponding to the photovoltaic system and at least one of maximum output power corresponding to the energy storage system and maximum output power corresponding to the power output system.

According to the detection method for the inverter system of the present disclosure, when the target system is the photovoltaic system and the photovoltaic system includes a plurality of photovoltaic strings, the output power corresponding to the target system is a sum of maximum output power corresponding to a first part of photovoltaic strings in the plurality of photovoltaic strings included in the photovoltaic system. The first part of photovoltaic strings are remaining photovoltaic strings among the plurality of photovoltaic strings excluding at least part of photovoltaic strings; and the at least part of photovoltaic strings include the faulty photovoltaic string.

According to the detection method for the inverter system of the present disclosure, the at least part of photovoltaic strings include the faulty photovoltaic string and at least one photovoltaic string located within a target range around the faulty photovoltaic string.

According to the detection method for the inverter system of the present disclosure, the performing the arc detection on the faulty photovoltaic string in the photovoltaic system based on the output power and the total power corresponding to the at least one load includes: performing the arc detection on the faulty photovoltaic string in the photovoltaic system in response to the output power corresponding to the target system being greater than or equal to the total power.

According to the detection method for the inverter system of the present disclosure, the performing the arc detection on the faulty photovoltaic string in the photovoltaic system based on the output power and the total power corresponding to the at least one load includes: disconnecting a non-critical load in the at least one load in response to the output power corresponding to the target system being smaller than the total power, where the non-critical load is predetermined; and performing the arc detection on the faulty photovoltaic string in the photovoltaic system in response to the output power corresponding to the target system being greater than or equal to total power corresponding to a critical load in the at least one load excluding the non-critical load.

According to the detection method for the inverter system of the present disclosure, the non-critical load includes at least one of a non-critical load on a direct-current side and a non-critical load on an alternating-current side; and the disconnecting the non-critical load in the at least one load includes: disconnecting the non-critical load in the at least one load based on a disconnection priority corresponding to the non-critical load on the direct-current side and a disconnection priority corresponding to the non-critical load on the alternating-current side, until the output power corresponding to the target system is greater than or equal to new total power.

According to the detection method for the inverter system of the present disclosure, there are a plurality of non-critical loads on each of the direct-current side and the alternating-current side, the disconnecting the non-critical load in the at least one load based on the disconnection priority corresponding to the non-critical load on the direct-current side and the disconnection priority corresponding to the non-critical load on the alternating-current side, until the output power corresponding to the target system is greater than or equal to the new total power includes: sequentially disconnecting the non-critical load on a target side with a higher disconnection priority among the non-critical loads on the direct-current side and the non-critical loads on the alternating-current side and obtaining the new total power; stopping the disconnection operation in response to the output power corresponding to the target system being greater than or equal to the new total power; and sequentially, in response to all the non-critical loads on the target side being disconnected and the output power corresponding to the target system being smaller than the new total power, disconnecting the non-critical loads on the other side other than the target side, until the output power corresponding to the target system is greater than or equal to the new total power.

According to the detection method for the inverter system of the present disclosure, the disconnecting the non-critical load in the at least one load based on the disconnection priority corresponding to the non-critical load on the direct-current side and the disconnection priority corresponding to the non-critical load on the alternating-current side includes: disconnecting, when the target system includes the photovoltaic system and at least one of an energy storage system and a power output system and the photovoltaic system includes one of the at least one photovoltaic string, the non-critical load in the at least one load based on the disconnection priority.

According to the detection method for the inverter system of the present disclosure, the disconnecting the non-critical load in the at least one load based on the disconnection priority corresponding to the non-critical load on the direct-current side and the disconnection priority corresponding to the non-critical load on the alternating-current side includes: disconnecting, when the target system includes the photovoltaic system and the photovoltaic system includes a plurality of photovoltaic strings, the non-critical load in the at least one load based on the disconnection priority.

According to the detection method for the inverter system of the present disclosure, the performing the arc detection on the faulty photovoltaic string in the photovoltaic system includes: adjusting output power of at least one of the photovoltaic system, an energy storage system, and a power output system that are included in the target system based on an operation priority; and performing the arc detection on the faulty photovoltaic string in the photovoltaic system.

According to the detection method for the inverter system of the present disclosure, the adjusting the output power of the at least one of the photovoltaic system, the energy storage system, and the power output system that are included in the target system based on the operation priority includes: increasing output power of a first system with the highest priority among the energy storage system and the power output system when the target system includes the photovoltaic system, the energy storage system, and the power output system, and the photovoltaic system is not allowed to output power; obtaining new output power of the target system; and controlling output power of a second system based on the new output power of the target system and the total power. The second system is a system other than the first system among the energy storage system and the power output system.

According to the detection method for the inverter system of the present disclosure, the controlling the output power of the second system based on the new output power of the target system and the total power includes: maintaining the output power of the second system unchanged in response to the new output power of the target system being greater than or equal to the total power; and increasing the output power of the second system in response to the output power of the first system being adjusted to maximum output power of the first system and the new output power of the target system being smaller than the total power.

According to the detection method for the inverter system of the present disclosure, the performing the arc detection on the faulty photovoltaic string in the photovoltaic system includes: lowering an output electrical signal of at least part of photovoltaic strings in the at least one photovoltaic string included in the photovoltaic system, to perform the arc detection on the faulty photovoltaic string in the photovoltaic system.

According to the detection method for the inverter system of the present disclosure, the lowering the output electrical signal of the at least part of photovoltaic strings in the at least one photovoltaic string included in the photovoltaic system, to perform the arc detection on the faulty photovoltaic string in the photovoltaic system includes: collecting, in response to the output electrical signal of the at least part of photovoltaic strings being lowered, a lowered output electrical signal; subsequent to obtaining the lowered output electrical signal, raising the output electrical signal of the at least part of photovoltaic strings and collecting the raised output electrical signal; determining that no arc is generated in the faulty photovoltaic string in response to the raised output electrical signal being greater than or equal to the lowered output electrical signal or the raised output electrical signal being greater than or equal to an electrical signal threshold; and determining that an arc is generated in the faulty photovoltaic string in response to the raised output electrical signal being smaller than the lowered output electrical signal and/or the raised output electrical signal being smaller than the electrical signal threshold.

In a second aspect, the present disclosure provides a detection apparatus for an inverter system. The inverter system is electrically connected to a photovoltaic system and at least one load. The photovoltaic system includes a plurality of photovoltaic strings, and the inverter system is configured to be electrically connected to an energy storage system and a power output system. The apparatus includes: a first processing module configured to obtain output power corresponding to a target system connected to the at least one load, where the target system is configured to supply power to the at least one load, and the target system includes the photovoltaic system; and a second processing module configured to perform arc detection on a faulty photovoltaic string in the photovoltaic system based on the output power and total power corresponding to the at least one load.

According to the detection apparatus for the inverter system of the present disclosure, the output power of the target system that supplies power to the at least one load is obtained, and the arc detection is performed based on the output power and the total power corresponding to the at least one load, which ensures the stability of the load operation during the arc detection process, mitigates the impact of the reduction of the output power of the inverter system on the load operation, improves the load performance and prolongs the service life of the load, and reduces the safety hazards caused by the unstable operation of the load, and improves the user experience.

In a third aspect, the present disclosure provides an inverter system. The inverter system is configured to perform detection based on the detection method for the inverter system as described in the first aspect.

In a fourth aspect, the present disclosure provides a non-transitory computer-readable storage medium, having a computer program stored thereon. The computer program, when executed by a processor, implements the detection method for the inverter system as described in the first aspect.

In a fifth aspect, the present disclosure provides a computer program product, including a computer program. The computer program, when executed by a processor, implements the detection method for the inverter system as described in the first aspect.

One or more technical solutions as described above in the embodiments of the present disclosure have at least one of the following technical effects.

The output power of the target system that supplies power to the at least one load is obtained, and the arc detection is performed based on the output power and the total power corresponding to the at least one load, which ensures the stability of the load operation during the arc detection process, mitigates the impact of the reduction of the output power of the inverter system on the load operation, improves the load performance and prolongs the service life of the load, and reduces the safety hazards caused by the unstable operation of the load, and improves the user experience.

Further, by determining that the maximum output power is greater than or equal to a total load, it can be ensured that the output power of the target system, when reaching its maximum value, can support the stable operation of each load. In this situation, the arc detection may be performed on the faulty photovoltaic string to ensure safety of the detection process.

Further, in response to determining that the output power corresponding to the target system is smaller than the total power, a non-critical load in a plurality of loads is disconnected, which reduces the number of the loads that need to be powered, thus reducing the total load. In this way, the output power of the target system can support for stable operation of the critical load, thereby ensuring an operation state of each load during the arc detection process and improving the safety of the detection process.

Further, by adjusting the output power of the photovoltaic system, the output power of the energy storage system, and the output power of the power output system based on the operation priority, a power supply system that is expected to output power preferentially can output power first, which effectively reduces a power output cost, saves energy and increases efficiency, and improves an energy utilization rate.

Additional aspects and advantages of the present disclosure will be provided in part in the following description, or will become apparent in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings, in which:

FIG. 14 is a structure schematic diagram of a detection apparatus for an inverter system provided according to an embodiment of the present disclosure; and FIG. 15 is a structure schematic diagram of an electronic device provided according to an embodiment of the present disclosure.

DETAILED DESCRIPTION

Figure 1:
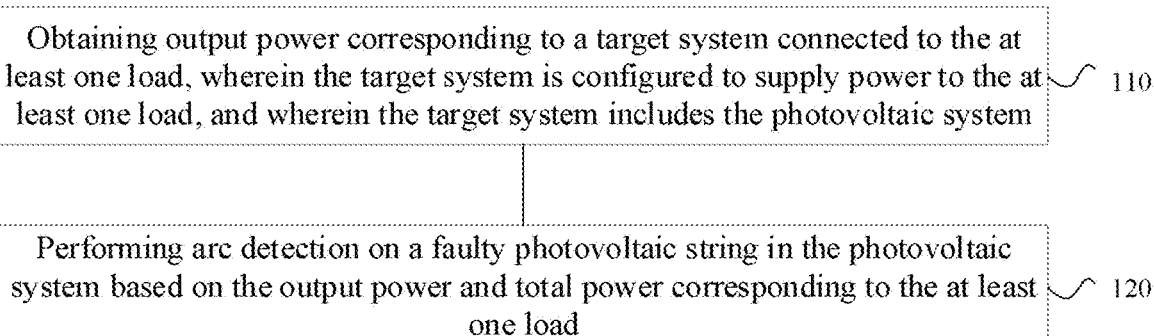
FIG. 1 is a first schematic flowchart of a detection method for an inverter system provided according to an embodiment of the present disclosure.

Technical solutions according to embodiments of the present disclosure will be described clearly below in combination with accompanying drawings of the embodiments of the present disclosure. Obviously, the embodiments described below are a part of the embodiments of the present disclosure, rather than all embodiments of the present disclosure. On a basis of the embodiments of the present disclosure, all other embodiments obtained by those skilled in the art shall fall within the scope of the present disclosure.

Terms such as "first" and "second" in the specification and claims of the present disclosure are used only to distinguish between similar objects, rather than to describe a particular order or sequence. It should be understood that the data as used can be interchanged where appropriate, to enable the embodiments of the present disclosure described herein to be implemented in an order other than that illustrated or described herein. Also, the objects distinguished by the terms such as "first" and "second" are usually objects of the same type. The quantity of objects is not limited. For example, a first object may be one first object or a plurality of first objects. In addition, "and/or" throughout the specification and claims indicates at least one of the objects associated with "and/or". The character "/" generally indicates that the associated objects before and after the character are in an "or" relationship.

A detection method for an inverter system, a detection apparatus for an inverter system, an inverter system, an electrical system, and a readable storage medium provided according to the embodiments of the present disclosure will be described below in detail with reference to specific embodiments and application scenarios thereof in combination with the accompanying drawings.

The detection method for the inverter system may be applied to a terminal and may be specifically executed by hardware or software in a terminal.

This terminal includes, but is not limited to, portable communication devices such as a mobile phone or a tablet computer. It should also be understood that in some embodiments, the terminal may not be the portable communication device, but a desktop computer.

In the following various embodiments, a terminal including a display and a touch-sensitive surface is described. However, it should be understood that the terminal may include one or more other physical user interface devices such as a physical keyboard, a mouse, and a control stick.

For the detection method for the inverter system provided in the embodiments of the present disclosure, the detection method for the inverter system may be executed by an inverter system, or a detection apparatus for the inverter system disposed on the inverter system, or a server electrically connected to (in a wired or wireless connection with) the inverter system, or a user terminal in a communication connection with the inverter system. The user terminal includes, but is not limited to a mobile terminal and a non-mobile terminal.

As shown in FIG. 1, the detection method for the inverter system includes: step 110 and step 120.

The inverter system is electrically connected to a photovoltaic system and at least one load.

The photovoltaic system includes at least one photovoltaic string.

The at least one load includes at least one of a load on a direct-current side and a load on an alternating-current side.

The load on the direct-current side and the load on the alternating-current side may be selectively connected based on an actual execution situation.

The load on the direct-current side refers to all loads on the direct-current side.

The load on the alternating-current side refers to all loads on the alternating-current side.

At step 110, output power corresponding to a target system connected to the at least one load is obtained.

In this step, the target system is configured to supply power to the at least one load.

The target system includes one or more power supply systems.

The target system may include a photovoltaic system.

The output power corresponding to the target system may include maximum output power corresponding to the target system, output power that approximates to the maximum output power corresponding to the target system, or user-defined output power.

In an actual implementation, the output power corresponding to the target system may be obtained based on an actual situation of a target system connected to a plurality of loads.

In some embodiments, when the target system includes a photovoltaic system, the target system may also include other systems capable of supplying power to the at least one load.

A specific type of a system included in the target system that supplies power to the at least one load may be determined based on the actual situation, and the present disclosure does not limit this.

In the actual implementation, the output power of the target system may be obtained in any achievable manner.

In some embodiments, when the target system may also include at least one of an energy storage system and a power output system, the output power corresponding to the target system is a sum of maximum output power corresponding to the photovoltaic system and at least one of maximum output power corresponding to the energy storage system and maximum output power corresponding to the power output system.

In this embodiment, the maximum output power corresponding to the photovoltaic system may be represented as Ps1.

The energy storage system may be configured to supply power to the at least one load.

The maximum output power of the energy storage system may be represented as Ps2.

Figure 4:
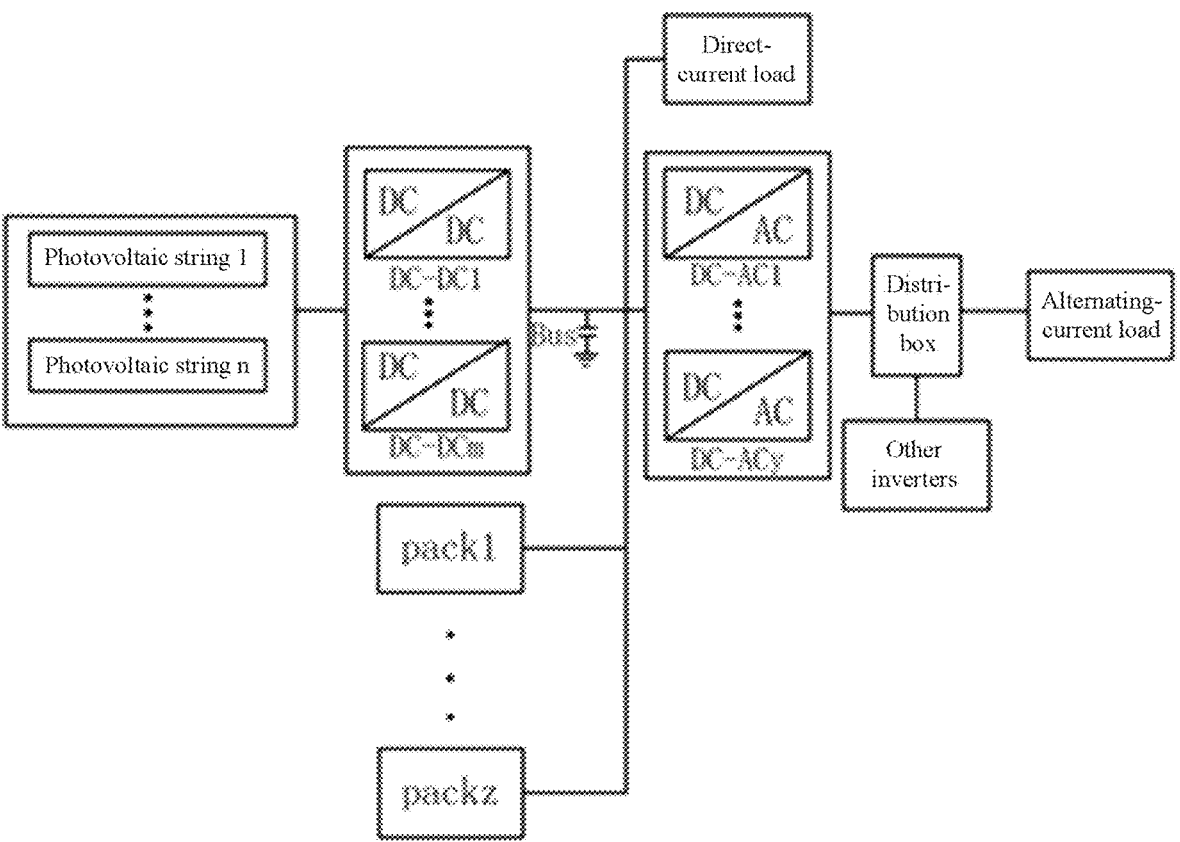
FIG. 4 is a first principle schematic diagram of a detection method for an inverter system provided according to an embodiment of the present disclosure.

As shown in FIG. 4, the energy storage system may include a plurality of battery packs.

Each battery pack includes at least one direct-current-direct-current (DC-DC) converter and a battery cell.

The power output system may be configured to supply power to the at least one load.

The power output system includes, but is not limited to, a fuel generator and other inverters.

The maximum output power of the power output system may be represented as Ps3.

In some embodiments, when the target system includes a photovoltaic system and the photovoltaic system includes one photovoltaic module, the target system may include at least one of the energy storage system and the power output system.

For example, the target system may include one photovoltaic module and the energy storage system.

The target system may include one photovoltaic module and the power output system.

The target system may include one photovoltaic module, the energy storage system, and the power output system.

It can be understood that when the photovoltaic system included in the target system includes one photovoltaic module, this photovoltaic module is a faulty photovoltaic module.

When the target system may include one photovoltaic module and the energy storage system, the output power of the target system is maximum output power of the energy storage system.

When the target system may include one photovoltaic module and the power output system, the output power of the target system is maximum output power of the power output system.

When the target system includes one photovoltaic module, the energy storage system, and the power output system, the output power of the target system is a sum of the maximum output power of the energy storage system and the maximum output power of the power output system.

In some embodiments, the target system may include a photovoltaic system, and the photovoltaic system includes a plurality of photovoltaic modules.

In this embodiment, the target system may include the photovoltaic system.

The target system may include the photovoltaic system and the energy storage system.

The target system may include the photovoltaic system and the power output system.

The target system may include the photovoltaic system, the energy storage system, and the power output system.

When the target system may include the photovoltaic system, the output power of the target system is maximum output power of the photovoltaic system.

When the target system may include the photovoltaic system and the energy storage system, the output power of the target system is a sum of the maximum output power of the photovoltaic system and maximum output power of the energy storage system.

When the target system may include the photovoltaic system and the power output system, the output power of the target system is a sum of the maximum output power of the photovoltaic system and maximum output power of the power output system.

When the target system may include the photovoltaic system, the energy storage system, and the power output system, the output power of the target system is a sum of the maximum output power of the photovoltaic system, the maximum output power of the energy storage system, and the maximum output power of the power output system.

According to the detection method for the inverter system provided in the embodiments of the present disclosure, by determining actual one or more systems included in the target system that are configured to supply power to the at least one load and obtaining maximum output power of each system that supplies power to the at least one load, the output power of the target system may be calculated. In this way, maximum power that may be outputted by the target system can be effectively determined, and accurate information about the power supply of the target system can be obtained, thereby performing arc detection based on the maximum output power in a subsequent process.

Figure 5:
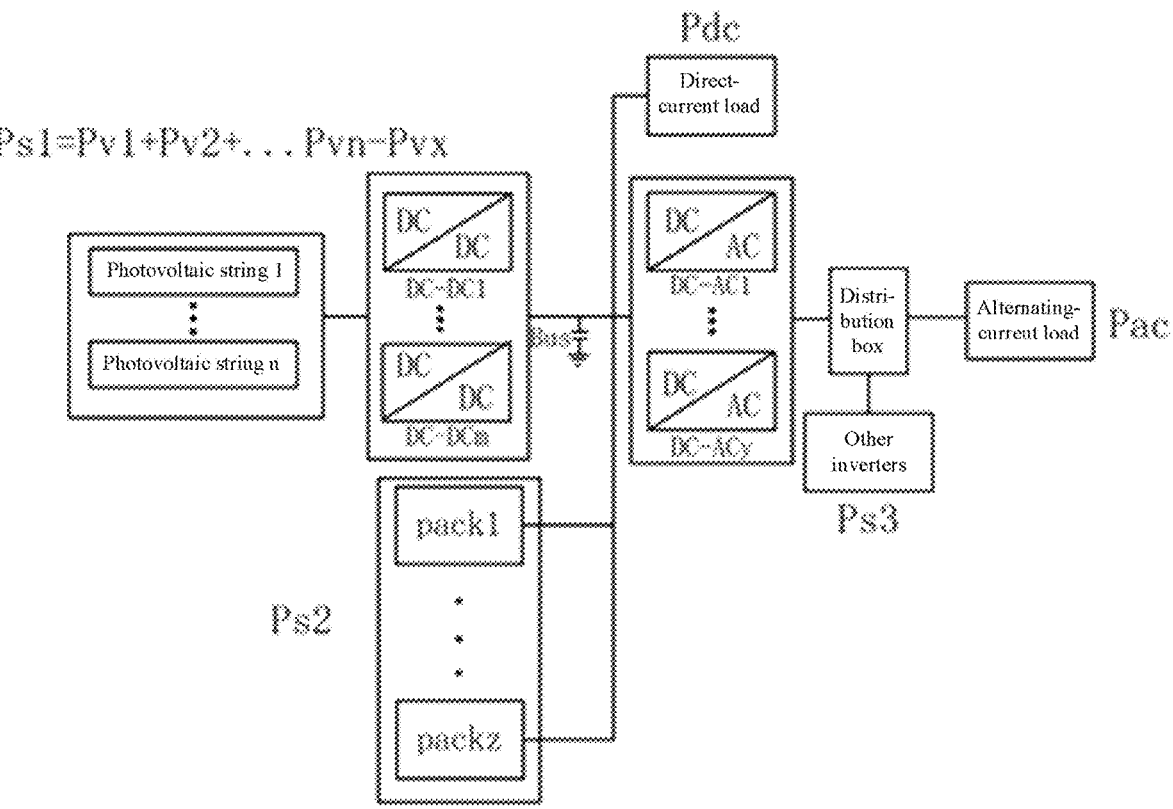
FIG. 5 is a second principle schematic diagram of a detection method for an inverter system provided according to an embodiment of the present disclosure.

As shown in FIG. 5, in some embodiments, when the target system is the photovoltaic system and the photovoltaic system includes a plurality of photovoltaic strings, the output power corresponding to the target system is a sum of maximum output power corresponding to a first part of photovoltaic strings in the plurality of photovoltaic strings included in the photovoltaic system.

In this embodiment, the first part of photovoltaic strings are remaining photovoltaic strings among the plurality of photovoltaic strings excluding at least part of photovoltaic strings.

The at least part of photovoltaic strings include the faulty photovoltaic string.

In some embodiments, the at least part of photovoltaic strings only include the faulty photovoltaic string.

As an example, the photovoltaic system includes five photovoltaic strings, and the faulty photovoltaic string is a third photovoltaic string. In this case, the at least part of photovoltaic strings is the third photovoltaic string, and the first part of photovoltaic strings are the remaining four photovoltaic strings after excluding the third photovoltaic string from the five photovoltaic strings.

The output power of the target system is a sum of maximum output power of the remaining four photovoltaic strings.

In some embodiments, the at least part of photovoltaic strings include the faulty photovoltaic string and at least one photovoltaic string located within a target range around the faulty photovoltaic string.

In this embodiment, the target range is a predetermined value for determining a photovoltaic string located around the faulty photovoltaic string.

A specific value of the target range may be determined based on the actual situation, and the present disclosure does not limit this.

As an example, the photovoltaic system includes five photovoltaic strings, and the faulty photovoltaic string is a third photovoltaic string. The at least part of photovoltaic strings may include the faulty photovoltaic string and the photovoltaic strings immediately before and after the faulty photovoltaic string, i.e., the at least part of photovoltaic strings includes the second, third, and fourth photovoltaic strings.

The first part of photovoltaic strings include the first and fifth photovoltaic strings in the five photovoltaic strings excluding the second, third, and fourth photovoltaic strings.

The detection method for the inverter system provided in the embodiments of the present disclosure determines the actual situation of the photovoltaic system included in the target system and uses some photovoltaic strings without faults to supply power to the at least one load. The faulty photovoltaic string and one or more photovoltaic strings located within the target range around the faulty photovoltaic string are not required to supply power to the at least one load. This alleviates a technical problem where the performance of a surrounding photovoltaic string of the faulty photovoltaic string is affected by the faulty photovoltaic string, making it impossible for the surrounding photovoltaic string to supply power stably. The output power of the target system is determined as stably available output power, which effectively provides accurate power supply data. This, in turn, provides precise data for ensuring stable operation of the at least one load in the subsequent process and improves accuracy of a determination condition.

In the actual implementation, the at least part of photovoltaic strings include the faulty photovoltaic string, or may include the faulty photovoltaic string and the at least one photovoltaic string located within the target range around the faulty photovoltaic string.

It can be determined whether the at least part of photovoltaic strings include the at least one photovoltaic string within the target range around the faulty photovoltaic string based on a determination of whether performance of the at least one photovoltaic string within the target range around the faulty photovoltaic string is affected by the faulty photovoltaic string.

For example, when the at least one photovoltaic string within the target range is capable of supplying power stably, it can be determined whether the at least part of photovoltaic strings merely include the faulty photovoltaic string.

Of course, a specific situation of the photovoltaic string included in the at least part of photovoltaic strings may also be determined based on other situations, and the present disclosure does not limit this.

According to the detection method for the inverter system provided in the embodiments of the present disclosure, by determining an actual photovoltaic string that can supply power to the at least one load in the photovoltaic system included in the target system, the output power of the target system is effectively determined, providing data support for determining whether the at least one load may operate stably in the subsequent process, thereby increasing a probability of the stable operation of the at least one load.

At step 120, arc detection is performed on a faulty photovoltaic string in the photovoltaic system based on the output power and total power corresponding to at least one load.

In this step, the total power is a sum of power required by the at least one load.

The total power includes power corresponding to the load on the direct-current side and power corresponding to the load on the alternating-current side.

The power corresponding to the load on the direct-current side may be represented as Pdc.

The power corresponding to the load on the alternating-current side may be represented as Pac.

In the actual implementation, the arc detection may be performed on the faulty photovoltaic string in the photovoltaic system based on a comparison between the maximum output power and the total power corresponding to the at least one load.

For example, when the maximum output power is sufficient to satisfy requirements for stable operation of all the at least one load, the arc detection is performed on the faulty photovoltaic string in the photovoltaic system.

Figure 2:
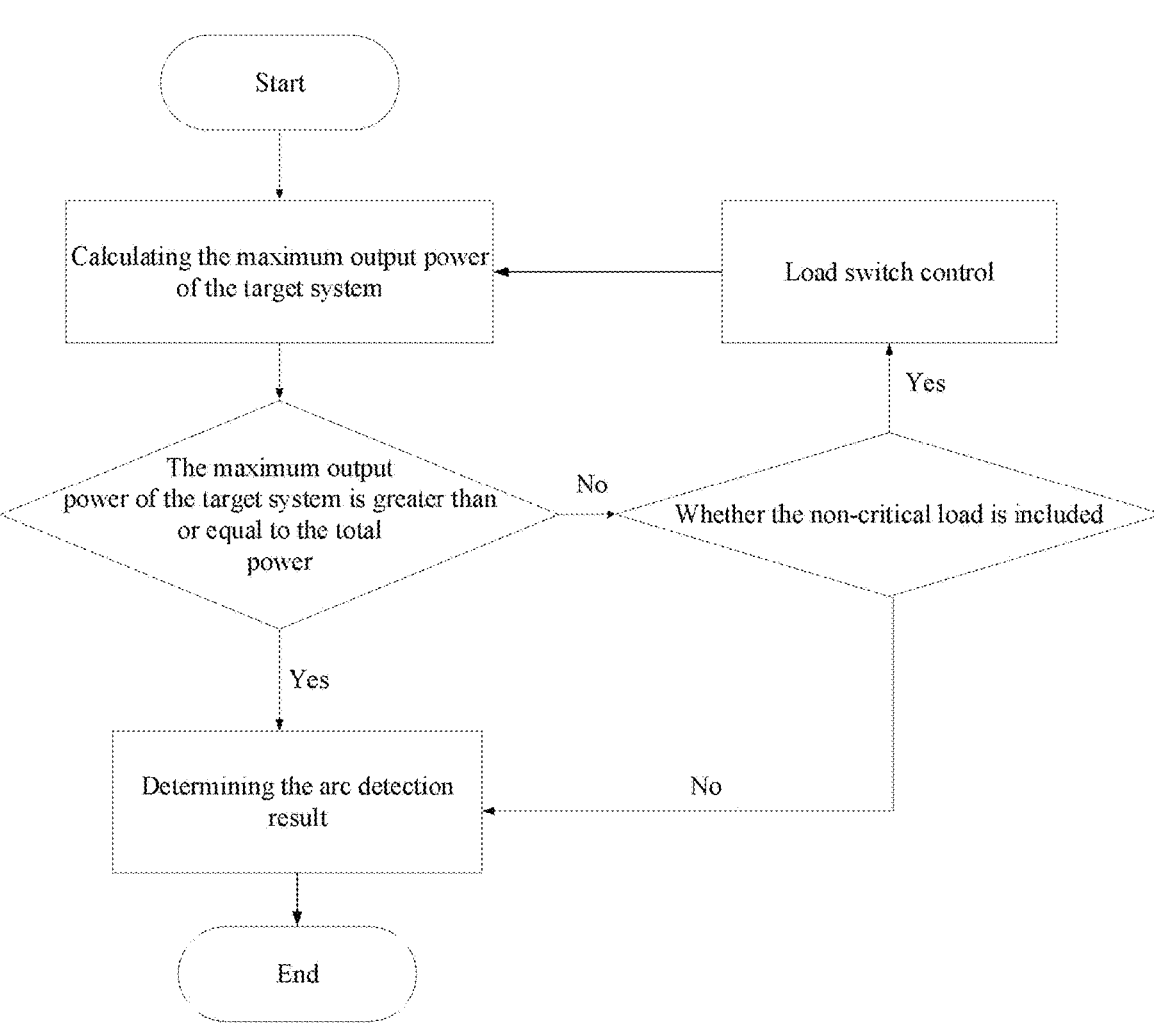
FIG. 2 is a second schematic flowchart of a detection method for an inverter system provided according to an embodiment of the present disclosure.

As shown in FIG. 2, in the actual implementation, the output power of the target system is calculated based on the maximum output power of each system included in the target system. Then, it is determined whether the maximum output power can satisfy the total power corresponding to the plurality of loads. When the maximum output power satisfy the total power corresponding to the plurality of loads, the arc detection is performed on the faulty photovoltaic module.

During the research and development process, the inventor found that an arc may be generated between the photovoltaic string and the inverter system due to poor contact, wiring fracture, and other reasons, and a false detection situation occurs in a process of detecting whether an arc is generated. In the related art, a method for determining whether false detection occurs requires controlling a current on the direct-current side to verify whether the wiring is really disconnected. During this period, power on the direct-current side decreases, leading to a reduction in output power of the inverter system, which cannot support stable operation of the loads on the direct-current or alternating-current side. This affects performance and a service life of the loads, and has safety hazards, affecting user experience.

The present disclosure effectively obtains the maximum output power that may be provided by the target system by obtaining the output power of the target system that supplies power to the at least one load, and compares the output power of the target system and the total power corresponding to the at least one load to determine whether the output power of the target system can satisfy the power required by each load, enabling each load to operate stably and ensuring operation stability of each load during an arc detection process.

According to the detection method for the inverter system provided in the embodiments of the present disclosure, the output power of the target system that supplies power to the at least one load is obtained, and the arc detection is performed based on the output power and the total power corresponding to the at least one load, which ensures stability of load operation during the arc detection process, mitigates an impact of the reduction of the output power of the inverter system on the load operation, improves load performance and prolongs service life of the load, reduces safety hazards caused by unstable operation of the load, and improves the user experience.

In some embodiments, the step 120 may further include: performing the arc detection on the faulty photovoltaic string in the photovoltaic system in response to the output power corresponding to the target system being greater than or equal to the total power.

In this embodiment, when the output power corresponding to the target system is greater than or equal to the total power, it indicates that the output power corresponding to the target system may allow for the stable operation of each load.

On the basis of the stable operation of each load, the arc detection may be performed on the faulty photovoltaic string in the photovoltaic system.

In some embodiments, the performing the arc detection on the faulty photovoltaic string in the photovoltaic system in response to the output power corresponding to the target system being greater than or equal to the total power may further include: performing the arc detection on the faulty photovoltaic string in the photovoltaic system in response to the output power corresponding to the target system being greater than or equal to a difference between the total power and wire arc power.

In this embodiment, the wire arc power is power required to maintain arcing in wires that connect the at least part of photovoltaic strings to the inverter system.

In the actual implementation, when the output power corresponding to the target system is greater than or equal to the difference between the total power and the wire arc power, it indicates that the output power corresponding to the target system may allow for the stable operation of each load.

In some embodiments, when the target system includes the photovoltaic system and the energy storage system, it can be determined that the output power corresponding to the target system is greater than or equal to the difference between the total power and the wire arc power based on the following formula:

$$Ps1+Ps2>=Pac+Pdc-\text{deltaP}$$

where Ps1 is the maximum output power corresponding to the photovoltaic system, Ps2 is the maximum output power corresponding to the energy storage system, Pac is the power corresponding to the load on the alternating-current side, Pdc is the power corresponding to the load on the direct-current side, and deltaP is the wire arc power.

As shown in FIG. 5, in some embodiments, when the target system includes the photovoltaic system, the energy storage system, and the power output system, it can be determined that the output power corresponding to the target system is greater than or equal to the difference between the total power and the wire arc power based on the following formula:

$$Ps1+Ps2+Ps3>=Pac+Pdc-\text{deltaP}$$

where Ps1 is the maximum output power corresponding to the photovoltaic system, Ps2 is the maximum output power corresponding to the energy storage system, Ps3 is the maximum output power corresponding to the power output system, Pac is the power corresponding to the load on the alternating-current side, Pdc is the power corresponding to the load on the direct-current side, and deltaP is the wire arc power.

In some embodiments, when the target system includes the photovoltaic system and the power output system, it can be determined that the output power corresponding to the target system is greater than or equal to the difference between the total power and the wire arc power based on the following formula:

$$Ps1 + Ps3 >= Pac + Pdc - \text{deltaP} \qquad 5$$

where Ps1 is the maximum output power corresponding to the photovoltaic system, Ps3 is the maximum output power corresponding to the power output system, Pac is the power corresponding to the load on the alternating-current side, Pdc is the power corresponding to the load on the direct-current side, and deltaP is the wire arc power.

In some embodiments, when the target system includes the photovoltaic system, it can be determined that the output power corresponding to the target system is greater than or equal to the difference between the total power and the wire arc power based on the following formula:

$$Ps1 >= Pac + Pdc - \text{deltaP}$$

where Ps1 is the maximum output power corresponding to the photovoltaic system, Pac is the power corresponding to the load on the alternating-current side, Pdc is the power corresponding to the load on the direct-current side, and deltaP is the wire arc power.

On the basis of the stable operation of each load, the arc detection may be performed on the faulty photovoltaic string in the photovoltaic system.

According to the detection method for the inverter system provided in the embodiments of the present disclosure, by determining that the maximum output power is greater than or equal to a total load, it is determined that when the output power of the target system reaches its maximum value, the stable operation of each load can be ensured. In this situation, the arc detection may be performed on the faulty photovoltaic string to ensure safety of the detection process.

In some embodiments, the step 120 may further include: disconnecting a non-critical load in the at least one load in response to the output power corresponding to the target system being smaller than the total power; and performing the arc detection on the faulty photovoltaic string in the photovoltaic system in response to the output power corresponding to the target system being greater than or equal to total power corresponding to a critical load in the at least one load excluding the non-critical load.

In this embodiment, the non-critical load is predetermined.

In some embodiments, the non-critical load may also be determined based on an interface connected to each load.

The non-critical load may also be user-defined or determined based on the actual condition, which is not limited in the present disclosure.

The critical load is the remaining load connected to the target system after the non-critical load is disconnected from all the loads.

The critical load and the non-critical load may be selectively connected to the target system based on requirements for an actual application scenario.

Continuing to refer to FIG. 2, in the actual implementation, in response to the output power of the target system being smaller than the total power, it may be checked whether the non-critical load is included in a plurality of loads connected to the target system.

In response to the non-critical load being included in the plurality of loads connected to the target system, the non-critical load may be disconnected through a load switch.

After the non-critical load is disconnected, the total power corresponding to the at least one load is redetermined, i.e., new total power is obtained. The output power corresponding to the target system and the new total power is compared.

In response to determining the output power corresponding to the target system being greater than or equal to the new total power, the arc detection may be performed on the faulty photovoltaic string.

According to the detection method for the inverter system provided in the embodiments of the present disclosure, in response to determining that the output power corresponding to the target system is smaller than the total power, the non-critical load in the plurality of loads is disconnected, which reduces the number of loads needing to be powered, thus reducing the total load. This allows the output power of the target system to support the stable operation of the critical load, thereby ensuring an operation state of each load during the arc detection process and improving the safety of the detection process.

In some embodiments, the non-critical load includes at least one of a non-critical load on a direct-current side and a non-critical load on an alternating-current side. The disconnecting the non-critical load in the at least one load may include: disconnecting the non-critical load in the at least one load based on a disconnection priority corresponding to the non-critical load on the direct-current side and a disconnection priority corresponding to the non-critical load on the alternating-current side, until the output power corresponding to the target system is greater than or equal to new total power.

In this embodiment, the load on the direct-current side may include critical load on the direct-current side and non-critical load on the direct-current side.

Power corresponding to the critical load on the direct-current side may be represented as Pdc_key.

A relationship between the power corresponding to the critical load on the direct-current side and the power corresponding to the load on the direct-current side may be determined based on the following formula:

$$Pdc\_key \le Pdc$$

where Pdc_key is the power corresponding to the critical load on the direct-current side, and Pdc is the power corresponding to the load on the direct-current side.

It can be understood that when no load is connected to the direct-current side, Pdc_key=Pdc=0.

The load on the alternating-current side may include a critical load on the alternating-current side and a non-critical load on the alternating-current side.

Power corresponding to the critical load on the alternating-current side may be represented as Pac_key.

A relationship between the power corresponding to the critical load on the alternating-current side and the power corresponding to the loads on the alternating-current side may be determined based on the following formula:

$$Pac\_key \le Pac$$

where Pac_key is the power corresponding to the critical load on the alternating-current side, and Pac is the power corresponding to the load on the alternating-current side.

It can be understood that when no load is connected to the alternating-current side, Pac_key=Pac=0.

The disconnection priority refer to priority levels for load disconnection.

The disconnection priority may be user-defined or determined based on the actual condition, which is not limited in the present disclosure.

The new total power is total power of the remaining load after excluding the disconnected non-critical load from the at least one load.

It can be understood that as the number of disconnected non-critical loads increases, the new total power decreases.

In the actual implementation, in response to determining that the non-critical load need to be disconnected, it can be determined whether to preferentially disconnect the non-critical load on the direct-current side or the non-critical load on the alternating-current side based on the disconnection priority, until the output power of the target system is greater than or equal to the new total power.

According to the detection method for the inverter system provided in the embodiments of the present disclosure, by selecting the non-critical load to be disconnected preferentially in the non-critical loads through the disconnection priority, it is possible to disconnect part of the non-critical loads while satisfying user's use requirements, enabling the output power of the target system to be greater than or equal to the new total power, thereby ensuring stability of the remaining critical load.

In some embodiments, there are a plurality of non-critical loads on each of the direct-current side and the alternating-current side, the disconnecting the non-critical load in the at least one load based on the disconnection priority corresponding to the non-critical load on the direct-current side and the disconnection priority corresponding to the non-critical load on the alternating-current side, until the output power corresponding to the target system is greater than or equal to the new total power may include: sequentially disconnecting the non-critical loads on a target side with a higher disconnection priority among the non-critical loads on the direct-current side and the non-critical loads on the alternating-current side and obtaining the new total power; stopping the disconnection operation in response to the output power corresponding to the target system being greater than or equal to the new total power; and sequentially disconnecting the non-critical loads on the side other than the target side in response to all the non-critical loads on the target side being disconnected and the output power corresponding to the target system being smaller than the new total power, until the output power corresponding to the target system is greater than or equal to the new total power.

In this embodiment, the target side is any one of the direct-current side and the alternating-current side.

The other side is a side different from the target side.

When the target side is the direct-current side, the other side is the alternating-current side.

When the target side is the alternating-current side, the other side is the direct-current side.

It can be understood that there may be a plurality of non-critical loads on each of the direct-current side and the alternating-current side.

In the actual implementation, the non-critical loads on the target side may be sequentially disconnected to obtain the new total power after the non-critical loads are disconnected, and a subsequent operation may be determined based on the new total power.

For example, when the target side is the direct-current side and there are five non-critical loads on the direct-current side, the five non-critical loads on the direct-current side may be sequentially disconnected. After any one of the non-critical loads on the direct-current side is disconnected, the new total power may be obtained, and the output power of the target system and the new total power may be compared to determine whether to continue to disconnect the non-critical loads on the direct-current side.

After two non-critical loads on the direct-current side are disconnected, in response to the output power of the target system being greater than or equal to the new total power, the disconnection operation may be stopped.

After all the five non-critical loads on the direct-current side are disconnected, in response to the output power corresponding to the target system being still smaller than the new total power, the non-critical loads on the other side, i.e., the alternating-current side, may be sequentially disconnected until the output power corresponding to the target system is greater than or equal to the new total power.

According to the detection method for the inverter system provided in the embodiments of the present disclosure, by sequentially disconnecting the non-critical loads on the target side with the higher disconnection priority and the non-critical loads on the other side, the total power required by the loads is gradually reduced, i.e., the new total power is obtained. This enables the output power of the target system to be greater than or equal to the new total power, thereby enabling each load to operate stably and improving the accuracy of arc detection.

As shown in Table 1, various situations of the photovoltaic system, energy storage system, and power output system included in the target system, as well as a relationship between the output power of the target system and total power required for the stable operation of the loads are shown.

TABLE 1

| Target system | | | Load to be determined | | | | |
|---|---|---|---|---|---|---|---|
| | | | All loads | Critical load | All loads | Critical load | |
| Photovoltaic system | Energy storage system | Power output system | on DC side | on AC side | on AC side | on AC side | Determination condition |
| √ | × | × | √ | × | √ | × | Ps1 >= Pdc + Pac − deltaP |
| √ | × | × | √ | × | × | √ | Ps1 >= Pdc + Pac_kev − deltaP |
| √ | × | × | × | √ | √ | × | Ps1 >= Pdc_kev + Pac − deltaP |
| √ | × | × | × | √ | × | √ | Ps1 >= Pdc_kev + Pac_kev − deltaP |
| × | √ | × | √ | × | √ | × | Ps2 >= Pdc + Pac − deltaP |
| × | √ | × | √ | × | × | √ | Ps2 >= Pdc + Pac_kev − deltaP |
| × | √ | × | × | √ | √ | × | Ps2 >= Pdc_kev + Pac − deltaP |
| × | √ | × | × | √ | × | √ | Ps2 >= Pdc_kev + Pac_kev − deltaP |
| × | × | √ | √ | × | √ | × | Ps3 >= Pdc + Pac − deltaP |
| × | × | √ | √ | × | × | √ | Ps3 >= Pdc + Pac_kev − deltaP |

TABLE 1-continued

| Target system | | | Load to be determined | | | | |
|---|---|---|---|---|---|---|---|
| | | | All loads | Critical load | All loads | Critical load | |
| Photovoltaic system | Energy storage system | Power output system | on DC side | on AC side | on AC side | on AC side | Determination condition |
| × | × | √ | × | √ | √ | × | Ps3 >= Pdc_kev + Pac – deltaP |
| × | × | √ | × | √ | √ | × | Ps3 >= Pdc_kev – Pac_kev – deltaP |
| √ | √ | × | √ | × | √ | × | Ps1 + Ps2 >= Pdc + Pac – deltaP |
| √ | √ | × | √ | × | × | √ | Ps1 + Ps2 >= Pdc + Pac_kev – deltaP |
| √ | √ | × | × | √ | √ | × | Ps1 + Ps2 >= Pdc_kev + Pac – deltaP |
| √ | √ | × | × | √ | × | √ | Ps1 + Ps2 >= Pdc_kev + Pac_kev – deltaP |
| √ | × | √ | √ | × | √ | × | Ps1 + Ps3 >= Pdc + Pac – deltaP |
| √ | × | √ | √ | × | × | √ | Ps1 + Ps3 >= Pdc + Pac_kev – deltaP |
| √ | × | √ | × | √ | √ | × | Ps1 + Ps3 >= Pdc_kev + Pac – deltaP |
| √ | × | √ | × | √ | × | √ | Ps1 + Ps3 >= Pdc_kev + Pac_kev – deltaP |
| × | √ | √ | √ | × | √ | × | Ps2 + Ps3 >= Pdc + Pac – deltaP |
| × | √ | √ | √ | × | × | √ | Ps2 + Ps3 >= Pdc + Pac_kev – deltaP |
| × | √ | √ | × | √ | √ | × | Ps2 + Ps3 >= Pdc_kev + Pac – deltaP |
| × | √ | √ | × | √ | × | √ | Ps2 + Ps3 >= Pdc_kev + Pac_kev – deltaP |
| √ | √ | √ | √ | × | √ | × | Ps1 + Ps2 + Ps3 >= Pdc + Pac – deltaP |
| √ | √ | √ | √ | × | × | √ | Ps1 + Ps2 + Ps3 >= Pdc + Pac_kev – deltaP |
| √ | √ | √ | × | √ | √ | × | Ps1 + Ps2 + Ps3 >= Pdc_kev + Pac – deltaP |
| √ | √ | √ | × | √ | × | √ | Ps1 + Ps2 + Ps3 >= Pdc_kev + Pac_kev – deltaP |

A power output device in Table 1 is a device that is capable of outputting power to the loads and included in the target system. "√" indicates the maximum output power of this component needs to be included in the maximum output power of the target system when it is determined whether the maximum output power satisfies the stable operation of the loads. "x" indicates that the maximum output power of this component does not need to be included in the maximum output power of the target system, or that the output power of this component is not desired during misdetection determination of the faulty photovoltaic string.

The load to be determined in Table 1 refer to the load connected to the target system. "√" indicates that the power of the corresponding load needs to be included in the total power when determining whether the output power of the target system satisfies the total power. DeltaP indicates the wire arc power.

It can be understood that the non-critical load to be disconnected will vary depending on the different power supply systems included in the target system.

A detailed description of disconnecting the non-critical load based on the actual situation of the target system is provided below.

In some embodiments, the disconnecting the non-critical load in the at least one load based on the disconnection priority corresponding to the non-critical load on the direct-current side and the disconnection priority corresponding to the non-critical load on the alternating-current side may include: disconnecting, when the target system includes the photovoltaic system and at least one of the energy storage system and the power output system and the photovoltaic system includes one photovoltaic string, the non-critical load in the at least one load based on the disconnection priority.

In this embodiment, in some implements, in response to the target system including the photovoltaic system and the energy storage system, and the output power corresponding to the target system being smaller than the total power, the non-critical load in the at least one load may be disconnected based on the disconnection priority corresponding to the non-critical load on the direct-current side and the disconnection priority corresponding to the non-critical load on the alternating-current side.

In this embodiment, as an example, the non-critical load on the direct-current side is disconnected. After the non-critical load on the direct-current side is disconnected, the output power of the target system and the total power corresponding to the critical load in at least one load excluding the non-critical load may be compared.

It can be determined that the output power of the target system is greater than or equal to the total power corresponding to the critical load in the at least one load excluding the non-critical load based on the following formula:

$$Ps1+Ps2>=Pac+Pdc\_key-deltaP$$

where Ps1 is the maximum output power corresponding to the photovoltaic system, Ps2 is the maximum output power corresponding to the energy storage system, Pac is the power corresponding to the load on the alternating-current side, Pdc_key is the power corresponding to the critical load on the direct-current side, and deltaP is the wire arc power.

As an example, the non-critical load on the alternating-current side is disconnected. After the non-critical load on the alternating-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1+Ps2>=Pac\_key+Pdc-deltaP$$

where Ps1 is the maximum output power corresponding to the photovoltaic system, Ps2 is the maximum output power corresponding to the energy storage system, Pac_key is the power corresponding to the critical load on the alternating-current side, Pdc_key is the power corresponding to the critical load on the direct-current side, and deltaP is the wire arc power.

In some embodiments, in response to the target system including the photovoltaic system, the energy storage system, and the power output system, and the output power corresponding to the target system being smaller than the total power, the non-critical load in the at least one load may be disconnected based on the disconnection priority corresponding to the non-critical load on the direct-current side and the disconnection priority corresponding to the non-critical load on the alternating-current side.

In this embodiment, as an example, the non-critical load on the direct-current side is disconnected. After the non-critical load on the direct-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1+Ps2+Ps3>=Pac+Pdc\_key-deltaP$$

where Ps1 is the maximum output power corresponding to the photovoltaic system, Ps2 is the maximum output power corresponding to the energy storage system, Ps3 is the maximum output power corresponding to the power output system, Pac is the power corresponding to the load on the alternating-current side, Pdc_key is the power corresponding to the critical load on the direct-current side, and deltaP is the wire arc power.

As an example, the non-critical load on the alternating-current side is disconnected. After the non-critical load on the alternating-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1+Ps2+Ps3>=Pac\_key+Pdc-deltaP$$

where Ps1 is the maximum output power corresponding to the photovoltaic system, Ps2 is the maximum output power corresponding to the energy storage system, Ps3 is the maximum output power corresponding to the power output system, Pac_key is the power corresponding to the critical load on the alternating-current side, Pdc is the power corresponding to the load on the direct-current side, and deltaP is the wire arc power.

In some embodiments, in response to the target system including the photovoltaic system and the power output system, and the output power corresponding to the target system being smaller than the total power, the non-critical load in the at least one load is disconnected based on the disconnection priority corresponding to the non-critical load on the direct-current side and the disconnection priority corresponding to the non-critical load on the alternating-current side.

In this embodiment, as an example, the non-critical load on the direct-current side is disconnected. After the non-critical load on the direct-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1+Ps3>=Pac+Pdc\_key-deltaP$$

where Ps1 is the maximum output power corresponding to the photovoltaic system, Ps3 is the maximum output power corresponding to the power output system, Pac is the power corresponding to the load on the alternating-current side, Pdc_key is the power corresponding to the critical load on the direct-current side, and deltaP is the wire arc power.

As an example, the non-critical load on the alternating-current side is disconnected. After the non-critical load on the alternating-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1+Ps3>=Pac\_key+Pdc-deltaP$$

where Ps1 is the maximum output power corresponding to the photovoltaic system, Ps3 is the maximum output power corresponding to the power output system, Pac_key is the power corresponding to the critical load on the alternating-current side, Pdc_key is the power corresponding to the critical load on the direct-current side, and deltaP is the wire arc power.

According to the detection method for the inverter system provided in the embodiments of the present disclosure, the non-critical load to be disconnected is determined based on the actual situation of the system that supplies power to the load and is included in the target system and the disconnection priority.

Figure 6:
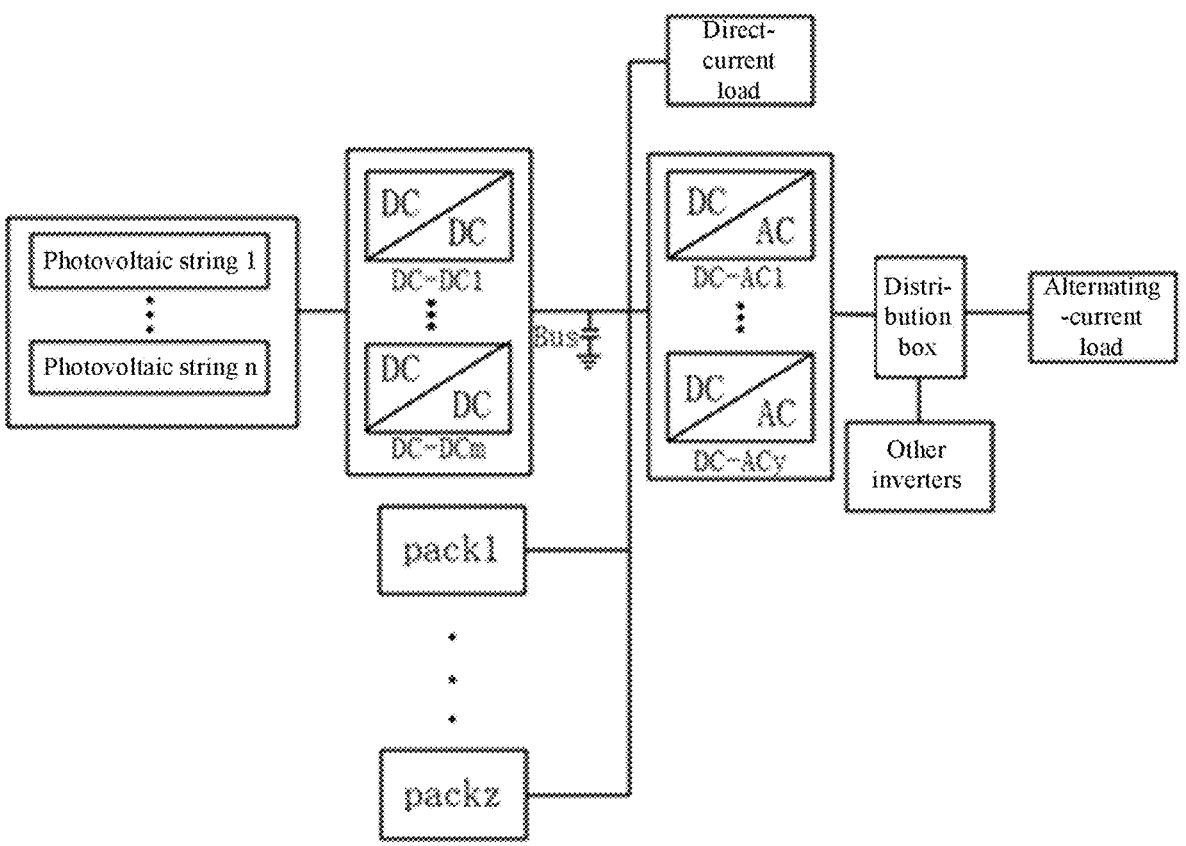
FIG. 6 is a third principle schematic diagram of a detection method for an inverter system provided according to an embodiment of the present disclosure.

As shown in FIG. 6, in some embodiments, disconnecting the non-critical load in the at least one load based on the disconnection priority corresponding to the non-critical load on the direct-current side and the disconnection priority corresponding to the non-critical load on the alternating-current side may include: disconnecting, when the target system includes the photovoltaic system and the photovoltaic system includes a plurality of photovoltaic strings, the non-critical load in the at least one load based on the disconnection priority.

In this embodiment, the maximum output power corresponding to the photovoltaic system may be determined based on maximum output power of the plurality of photovoltaic modules, i.e., Ps1 is a sum of the maximum output power of the plurality of photovoltaic modules.

As an example, the non-critical load on the direct-current side is disconnected. After the non-critical load on the direct-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1>=Pac+Pdc\_key-deltaP$$

where Ps1 is the maximum output power corresponding to the photovoltaic system, Pac is the power corresponding to the load on the alternating-current side, Pdc_key is the power corresponding to the critical load on the direct-current side, and deltaP is the wire arc power.

As an example, the non-critical load on the alternating-current side is disconnected. After the non-critical load on the alternating-current side is disconnected, the output power of the target system and the total power corresponding to the critical load in the at least one load excluding the non-critical load may be compared.

It can be determined that the output power of the target system is greater than or equal to the total power corresponding to the critical load in the at least one load excluding the non-critical load based on the following formula:

$$Ps1 >= Pac\_key + Pdc - deltaP$$

where Ps1 is the maximum output power corresponding to the photovoltaic system, Pac_key is the power corresponding to the critical load on the alternating-current side, Pdc is the power corresponding to the load on the direct-current side, and deltaP is the wire arc power.

In some embodiments, the target system may further include a photovoltaic system including a plurality of photovoltaic strings and at least one of an energy storage system and a power output system.

In this embodiment, when the target system includes the photovoltaic system and the at least one of the energy storage system and the power output system, and the photovoltaic system includes one photovoltaic string, the non-critical load in the at least one load may be disconnected based on the disconnection priority corresponding to the non-critical load on the direct-current side and the disconnection priority corresponding to the non-critical load on the alternating-current side. The non-critical load is disconnected in a similar way. To avoid repetition, details are omitted herein.

According to the detection method for the inverter system provided in the embodiments of the present disclosure, by determining that the target system includes the photovoltaic system and determining the non-critical load that need to be disconnected based on the disconnection priority, it is ensured that the disconnection of the non-critical load does not affect the user experience.

In some embodiments, performing the arc detection on the faulty photovoltaic string in the photovoltaic system may include: adjusting output power of at least one of the photovoltaic system, an energy storage system, and a power output system that are included in the target system based on an operation priority; and performing the arc detection on the faulty photovoltaic string in the photovoltaic system.

In this embodiment, the operation priority is a priority for determining preferential output power of the target system.

The operation priority may be user-defined or determined based on the actual execution situation, which is not limited in the present disclosure.

It can be understood that each system included in the target system has a corresponding operation priority.

In the actual implementation, the output power of the target system may be adjusted based on the operation priority of each system included in the target system.

For example, output power with a high operation priority corresponding to each system included in the target system is adjusted preferentially, so that the power required by the plurality of loads can be satisfied by the target system.

When the adjusted target system allows for the stable operation of the load, the arc detection may be performed on the faulty photovoltaic string in the photovoltaic system.

Figure 3:
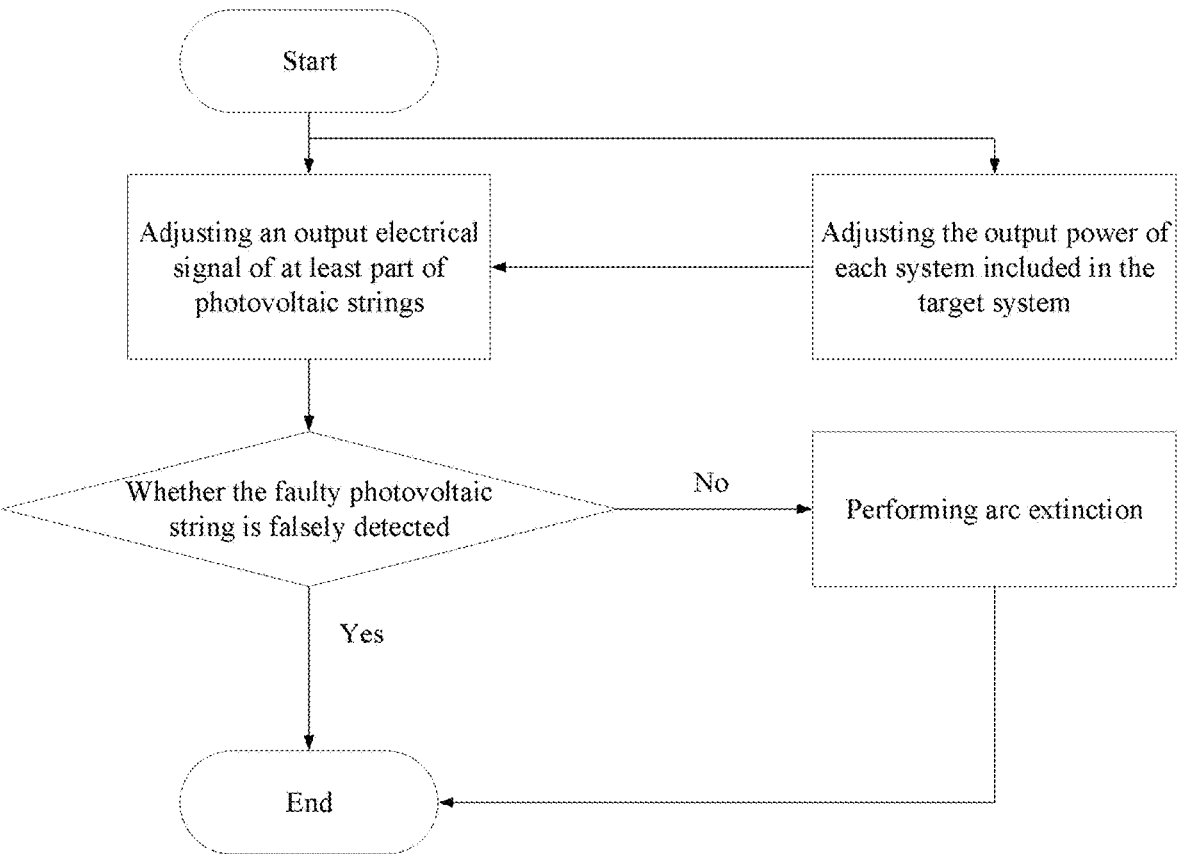
FIG. 3 is a third schematic flowchart of a detection method for an inverter system provided according to an embodiment of the present disclosure.

As shown in FIG. 3, by adjusting the output power of one or more of the photovoltaic system, the energy storage system, and the power output system that are included in the target system, the output power of the target system can satisfy the total power required for the stable operation of the load. Moreover, an output electrical signal of the at least part of photovoltaic strings is adjusted to perform the arc detection on the faulty photovoltaic string, to determine whether the arc is generated in the faulty photovoltaic string, and perform an arc extinction operation when it is determined that the arc is generated.

According to the detection method for the inverter system provided in the embodiments of the present disclosure, by adjusting the output power of the photovoltaic system, the output power of the energy storage system, and the output power of the power output system based on the operation priority, a power supply system that is preferred to output power is allowed to output power preferentially, which effectively reduces a power output cost, saves energy and increases efficiency, and improves an energy utilization rate.

As shown in Table 2, various situations of operation priorities are shown.

TABLE 2

| Power output device | | | |
|---|---|---|---|
| Photovoltaic system | Energy storage system | Power output system | Operation priority |
| √ | x | x | Photovoltaic system |
| x | √ | x | Energy storage system |
| x | x | √ | Power output system |
| √ | √ | x | Photovoltaic system > energy storage system |
| √ | √ | x | Energy storage system > photovoltaic system |
| √ | x | √ | Photovoltaic system > power output system |
| √ | x | √ | Power output system > photovoltaic system |
| x | √ | √ | Energy storage system > power output system |
| x | √ | √ | Power output system > energy storage system |
| √ | √ | √ | Photovoltaic system > energy storage system > power output system |
| √ | √ | √ | Photovoltaic system > power output system > energy storage system |
| √ | √ | √ | Energy storage system > photovoltaic system > power output system |
| √ | √ | √ | Energy storage system > Power output system > photovoltaic system |
| √ | √ | √ | Power output system > energy storage system > photovoltaic system |
| √ | √ | √ | Power output system > photovoltaic system > energy storage system |

In the actual implementation, the required operation priority may be selected based on the actual situation of the target system to satisfy practical usage requirements and reduce usage costs.

A method for adjusting the output power of the target system based on the operation priority is described below.

First, when the target system includes the photovoltaic system, the energy storage system, and the power output system, and the photovoltaic system is not allowed to output power, an adjustment is performed based on the operation priority.

Figure 7:
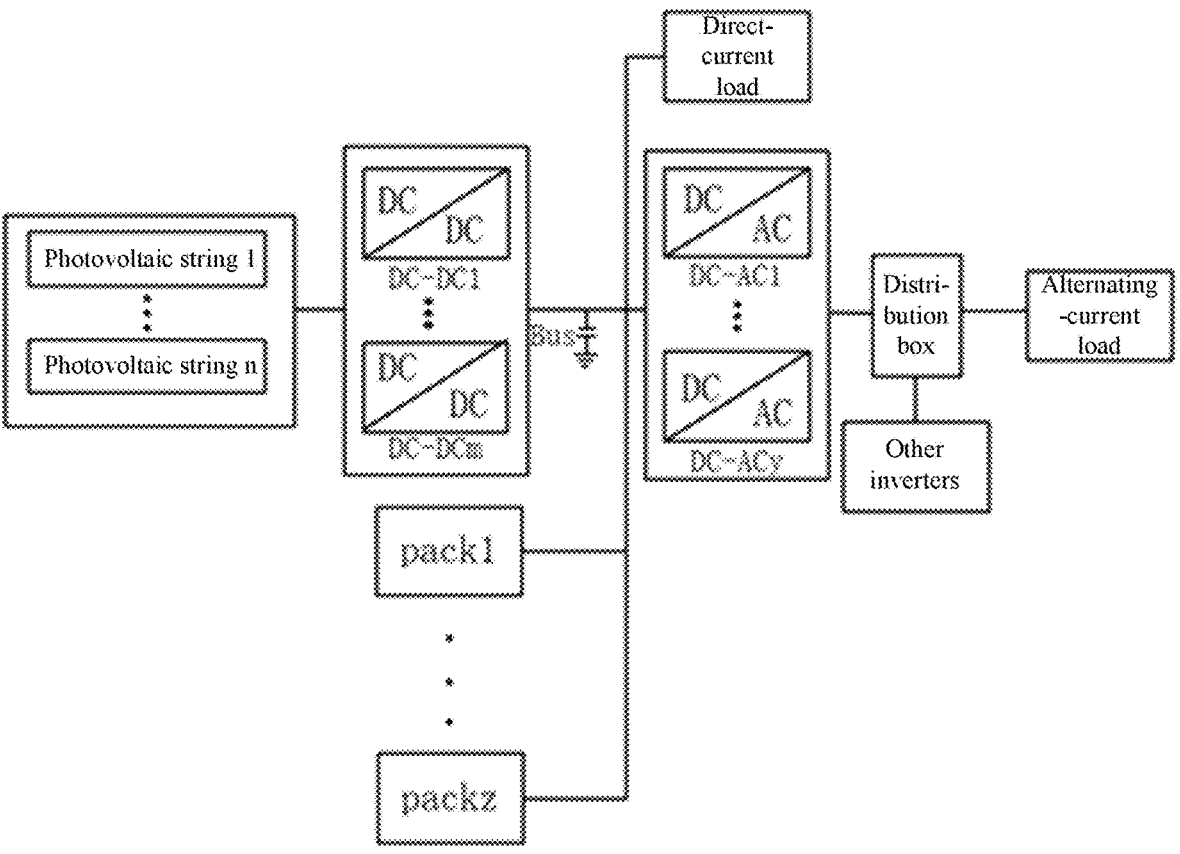
FIG. 7 is a fourth principle schematic diagram of a detection method for an inverter system provided according to an embodiment of the present disclosure.

As shown in FIG. 7, in some embodiments, the adjusting the output power of at least one of the photovoltaic system, the energy storage system, and the power output system that are included in the target system based on the operation priority may include: increasing output power of a first system with the highest priority among the energy storage system and the power output system when the target system includes the photovoltaic system, the energy storage system, and the power output system, and the photovoltaic system is not allowed to output power; obtaining new output power of the target system; and controlling output power of a second system based on the new output power of the target system and the total power.

In this embodiment, the first system is any one of the energy storage system and the power output system.

The second system is a system other than the first system among the energy storage system and the power output system.

When the first system is the energy storage system, the second system is the power output system.

When the first system is the power output system, the second system is the energy storage system.

In some embodiments, before the output power of the first system with the highest priority among the energy storage system and the power output system is increased, the output power of the energy storage system and the output power of the power output system are set to initial values.

In this embodiment, the initial values may be determined based on the actual situation. For example, the initial values may be 0 or 10, which is not limited in the present disclosure.

In the actual implementation, the output power of the energy storage system and the output power of the power output system may be increased in any feasible manner, which is not limited in the present disclosure.

It can be understood that during the process of increasing the output power of the energy storage system and the output power of the power output system, new output power of the target system may be updated in real time.

When the first system is the energy storage system, the new output power of the target system may be calculated based on the initial value of the output power of the energy storage system, an increase amount in the output power of the energy storage system, and the initial value of the output power of the power output system.

In some embodiments, the output power of the first system with the highest priority among the energy storage system and the power output system may be increased based on a first amplitude.

In this embodiment, a specific value of the first amplitude may be user-defined or determined based on the actual situation, which is not limited in the present disclosure.

For example, taking the first system as the energy storage system and the second system as the power output system.

In the actual implementation, the output power of the energy storage system may be increased preferentially based on the first system with the highest priority, thereby increasing the output power of the target system. The power output system is then controlled based on a relationship between the new output power of the target system and the total power.

In some embodiments, the new output power of the target system and the total power may be compared in real time, to determine whether to stop increasing the output power of the energy storage system.

For another example, taking the first system as the power output system, and the second system as the energy storage system.

In the actual implementation, the output power of the power output system may be increased based on the first system with the highest priority. After the output power of the power output system is increased, the output power of the target system will also change. The new output power of the target system may be obtained, and the energy storage system is controlled based on the relationship between the new output power of the target system and the total power.

In some embodiments, the new output power of the target system and the total power may be compared in real time, to determine whether to stop increasing the output power of the power output system.

According to the detection method for the inverter system provided in the embodiments of the present disclosure, by preferentially increasing the output power of the first system with the highest priority in the energy storage system and the power output system, the output power of the target system is increased, allowing the output power of the target system to gradually satisfy the power requirements of the load. After the output power of the first system is increased, a subsequent operation for the second system may be determined based on the relationship between the new output power of the target system and the total load. This avoids the need to increase output power of each power supply system included in the target system, thereby effectively saving the energy, reducing energy waste, and improving the energy utilization rate.

In some embodiments, the controlling the output power of the second system based on the new output power of the target system and the total power may include: maintaining the output power of the second system unchanged in response to the new output power of the target system being greater than or equal to the total power; and increasing the output power of the second system in response to the output power of the first system being adjusted to maximum output power of the first system and the new output power of the target system being still smaller than the total power.

In this embodiment, when the new output power of the target system is greater than or equal to the total power, it indicates that the new output power of the target system can support the stable operation of the load. The target system can then operate based on the new output power of the target system.

In the actual implementation, the output power of the first system may be increased to its maximum output power. After the output power of the first system is increased to its maximum output power, the new output power of the target system is determined based on the maximum output power of the first system.

In response to the output power of the first system being adjusted to its maximum output power of the first system and the new output power of the target system being still smaller than the total power required for the stable operation of load, the output power of the second system may be increased.

As shown in FIG. 6, for example, in the actual implementation, when the target system includes the photovoltaic system, the energy storage system, and other inverters (i.e., the power output system), the photovoltaic system is not desired to output power, the first system is the energy storage system and the second system is other inverters, the output power of the energy storage system may be further increased.

During the process of increasing the output power of the energy storage system, when the energy storage system may satisfy the total power required for the stable operation of the load before reaching its maximum output power, the increase in the output power of the energy storage system may be stopped.

The new output power of the target system may be obtained based on the increased output power of the energy storage system.

In response to the new output power of the target system being greater than or equal to the total power, the new output power of other inverters may be maintained unchanged, allowing the target system to operate based on the output power of the target system.

In response to the output power of the energy storage system being increased to the maximum output power of the energy storage system and the new output power of the target system being smaller than the total power, the output power of other inverters (i.e., the second system) may be further increased until the new output power of the target system is greater than or equal to the total power, allowing the new output power of the target system to satisfy the total power required for the stable operation of the load.

As shown in FIG. 7, for example, in the actual implementation, when the target system includes the photovoltaic system, the energy storage system, and a fuel generator (i.e., the power output system), the photovoltaic system is not desired to output power, and the first system is the energy storage system and the second system is the fuel generator, the output power of the energy storage system may be further increased.

During the process of increasing the output power of the energy storage system, when the energy storage system may satisfy the total power required for the stable operation of the load before reaching the maximum output power of the energy storage system, the increase in the output power of the energy storage system may be stopped.

The new output power of the target system may be obtained based on the increased output power of the energy storage system.

In response to the new output power of the target system being greater than or equal to the total power, output power of the fuel generator may be maintained unchanged, allowing the target system to operate based on the new output power of the target system.

In response to the output power of the energy storage system being increased to the maximum output power and the new output power of the target system being smaller than the total power, the output power of the fuel generator (i.e., the second system) may be further increased until the new output power of the target system is greater than or equal to the total power, allowing the new output power of the target system to satisfy the total power required for the stable operation of the load.

For another example, in the actual implementation, when the target system includes the photovoltaic system, the energy storage system, and other inverters, the photovoltaic system being not desired to output power, and the first system being other inverters and the second system being the energy storage system, the output power of other inverters may be preferentially adjusted and continuously increased.

During a process of increasing the output power of the other inverters, when the total power required for the stable operation of the load can be satisfied before the other inverters reaches its maximum output power, the increase in the output power of other inverters may be stopped.

The new output power of the target system may be obtained based on the increased output power of other inverters.

In response to the new output power of the target system being greater than or equal to the total power, the output power of the second system may be maintained unchanged, allowing the target system to operate based on the new output power of the target system.

In response to the output power of the other inverters being increased to the maximum output power of other inverters and the output power of the new target system being smaller than the total power, the output power of the energy storage system (i.e., the second system) may be further increased until the new output power of the new target system is greater than or equal to the total power, allowing the output power of the new target system to satisfy the total power required for the stable operation of the load.

In the actual implementation, when the target system includes the photovoltaic system, the energy storage system, and the fuel generator, the photovoltaic system is not desired to output power, and the first system is the fuel generator and the second system is the energy storage system, the output power of the fuel generator may be preferentially adjusted and continuously increased.

During the process of increasing the output power of the fuel generator, when the total power required for the stable operation of the load can be satisfied before the fuel generator reaches its maximum output power, the increase in the output power of the fuel generator may be stopped.

The new output power of the target system may be obtained based on the increased output power of the fuel generator.

In response to the new output power of the target system being greater than or equal to the total power, the output power of the second system may be maintained unchanged, allowing the target system to operate based on the new output power of the target system.

In response to the output power of the fuel generator being increased to the maximum output power of the fuel generator and the new output power of the target system being smaller than the total power, the output power of the energy storage system (i.e., the second system) may be further increased until the new output power of the target system is greater than or equal to the total power, allowing the new output power of the target system to satisfy the total power required for the stable operation of the load.

According to the detection method for the inverter system provided in the embodiments of the present disclosure, the output power of the first system is increased to obtain the new output power of the target system, and the new output power of the target system is then used to determine whether it may satisfy the total power required by the at least one load. After the output power of the first system is increased to its maximum output power, when the new output power of the target system still not satisfying the total power required by the at least one load, the output power of the second system is further increased to increase the output power of the target system. This avoids the need to adjust the output power of all power supply system in the target system to their maximum output power in any case, which improves the energy utilization rate and reduces resource waste.

When the target system includes the photovoltaic system, the energy storage system, and the power output system, and the photovoltaic system is allowed to output power, the adjustment is performed based on the operation priority.

Figure 8:
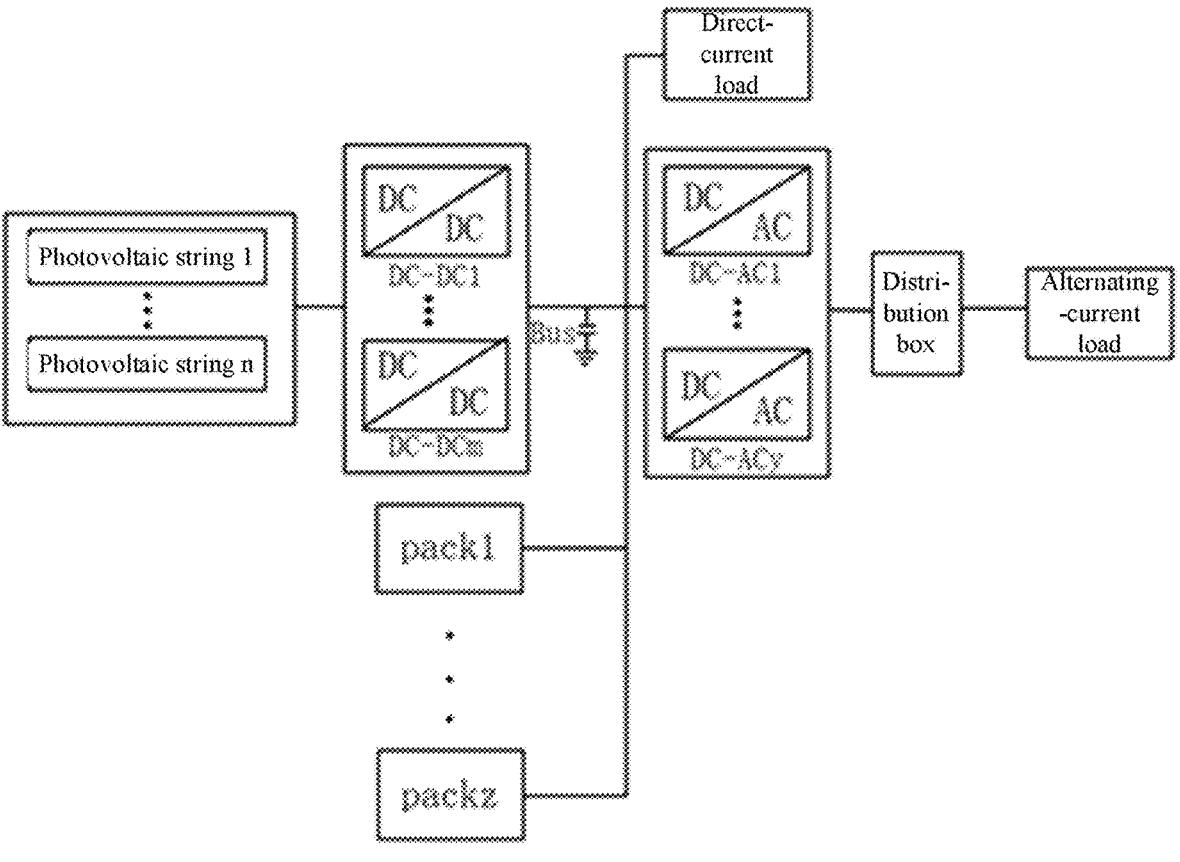
FIG. 8 is a fifth principle schematic diagram of a detection method for an inverter system provided according to an embodiment of the present disclosure.

As shown in FIG. 8, in some embodiments, the adjusting the output power of the at least one of the photovoltaic system, the energy storage system, and the power output system that are included in the target system based on the operation priority may include:

when the target system includes the photovoltaic system, the energy storage system, and the power output system, increasing output power of a first system with the highest priority among the photovoltaic system, the energy storage system and the power output system; obtaining new output power of the target system; and controlling at least one of output power of the second system and output power of the third system based on the new output power of the target system and the total power.

In this embodiment, the second system is a system other than the first system among the photovoltaic system, the energy storage system, and the power output system.

The third system is a system other than the first system and the second system among the photovoltaic system, the energy storage system, and the power output system.

As an example, the first system is the photovoltaic system. The second system may be the energy storage system, and the third system may be the power output system.

As an example, the first system is the photovoltaic system. The second system may be the power output system, and the third system may be the energy storage system.

As shown in FIG. 6, the power output system may be other inverters.

Continuing to refer to FIG. 7, the power output system may be a fuel generator.

Figures 12, 13:
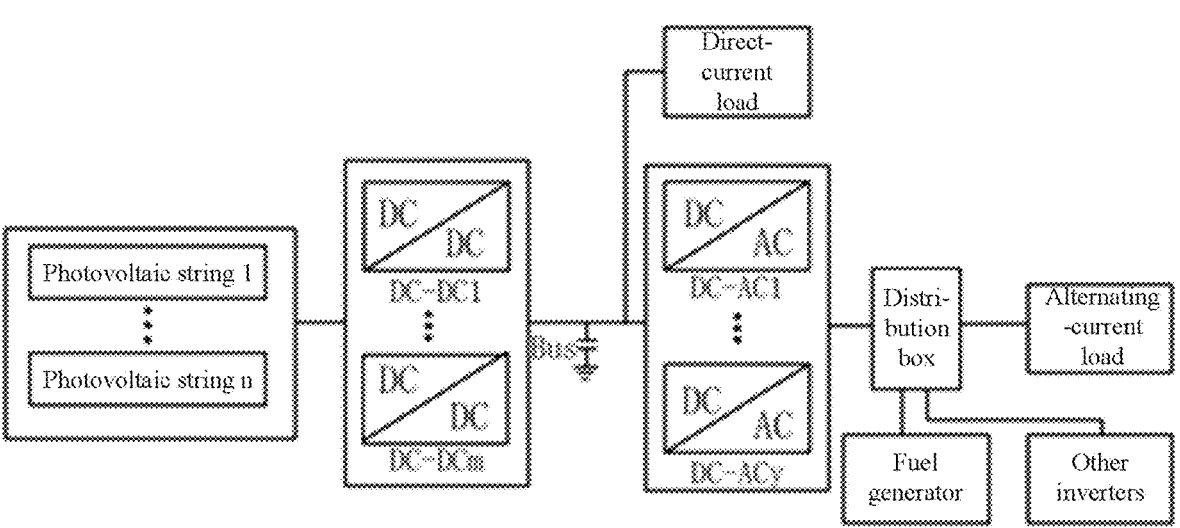
FIG. 12 is a ninth principle schematic diagram of a detection method for an inverter system provided according to an embodiment of the present disclosure.
FIG. 13 is a tenth principle schematic diagram of a detection method for an inverter system provided according to an embodiment of the present disclosure.

As shown in FIG. 12, the power output system may also include other inverters and the fuel generator.

For example, when the first system is the photovoltaic system, the second system may be the energy storage system or the power output system.

In the actual implementation, the output power of the photovoltaic system may be increased. After the output power of the photovoltaic system is increased, the output power of the target system will also change, and the new output power of the target system may be obtained. Based on the relationship between the new output power of the target system and the total power, the subsequent operation may be performed.

In some embodiments, the new output power of the target system and the total power may be compared in real time, to determine whether to further increase the output power of the second system, i.e., to increase the output power of the energy storage system or the output power of the power output system.

For example, when the first system is the energy storage system, the second system may be the photovoltaic system or the power output system.

In the actual implementation, the output power of the energy storage system may be increased. After the output power of the energy storage system is increased, the output power of the target system will also change, and the new output power of the target system may be obtained. Based on the relationship between the new output power of the target system and the total power, the subsequent operation may be performed.

In some embodiments, the power output system may also include other inverters and the fuel generator, and when the output power of the power output system needs to be increased, the output power of other inverters may be preferentially increased, or the output power of the fuel generator may be preferentially increased, or the output power of the fuel generator and other inverters may be increased simultaneously.

In this embodiment, a priority of increasing the output power of other inverters or the output power of the fuel generator may be determined based on the actual situation, which is not limited in the present disclosure.

In some embodiments, the new output power of the target system and the total power may be compared in real time, to determine whether to further increase the output power of the second system, i.e., to increase the output power of the photovoltaic system or the output power of the power output system.

For another example, when the first system is the power output system, the second system is the energy storage system or the photovoltaic system.

In the actual implementation, the output power of the power output system may be increased. After the output power of the power output system is increased, the output power of the target system will also change, and the new output power of the target system may be obtained. Based on the relationship between the new output power of the target system and the total power, the subsequent operation may be performed.

In some embodiments, the new output power of the target system and the total power may be compared in real time, to determine whether to further increase the output power of the second system, i.e., to increase the output power of the photovoltaic system or the output power of the energy storage system.

According to the detection method for the inverter system provided in the embodiments of the present disclosure, by increasing the output power of the first system with the highest priority among the photovoltaic system, the energy storage system, and the power output system, the output power of the target system may be increased, allowing the output power of the target system to gradually satisfy the power requirements of the loads. After the output power of the first system is increased, the relationship between the output power of the target system and the total load can be used to determine whether to continue to increase the output power of the second system and the third system. There is no need to directly adjust the output power of the target system to its maximum output power. The output power of the target system is reasonably adjusted, which effectively saves energy, reduces energy waste, and improves energy utilization rate.

In some embodiments, controlling at least one of the output power of the second system and the output power of the third system based on the new output power of the target system and the total power may include: maintaining the output power of the second system and the output power of the third system unchanged in response to the new output power of the target system being greater than or equal to the total power; and increasing the at least one of the output power of the second system and the output power of the third system in response to the output power of the first system being adjusted to the maximum output power of the first system and the new output power of the target system being smaller than the total power.

In this embodiment, in the actual implementation, when the new output power of the target system is greater than or equal to the total power, it indicates that the new output power of the target system can support the stable operation of the load. The target system can then operate based on the new output power of the target system.

The output power of the first system may be increased to the maximum output power of the first system. After the output power of the first system is increased to the maximum output power of the first system, the new output power of the target system is determined based on the maximum output power of the first system.

When the output power of the first system is adjusted to the maximum output power of the first system and the new output power of the target system is still smaller than the total power required for the stable operation of the load, the output power of one or more of the second system and the third system may be further increased.

For example, in the actual implementation, when the target system includes the photovoltaic system, the energy storage system, and the power output system, and the first system is the photovoltaic system and the second system is the energy storage system or the power output system, the output power of the photovoltaic system may be preferentially adjusted and continuously increased.

During the process of increasing the output power of the photovoltaic system, when the total power required for the stable operation of the load can be satisfied before the photovoltaic system reaches its maximum output power, the increase in the output power of the energy storage system may be stopped.

The new output power of the target system may be obtained based on the increased output power of the photovoltaic system.

In response to the new output power of the target system being greater than or equal to the total power, the output power of the energy storage system and the power output system may be maintained unchanged, allowing the target system to operate based on the new output power of the target system.

In response to the output power of the photovoltaic system being increased to the maximum output power of the photovoltaic system, and the new output power of the target system being still smaller than the total power, the output power of one or more of the energy storage system and the power output system (i.e., the second system and the third system) may be further increased until the new output power of the target system is greater than or equal to the total power, allowing the new output power of the target system to satisfy the total power required for stable operation of the load.

For example, in the actual implementation, when the target system includes the photovoltaic system, the energy storage system, and the power output system, and the first system is the energy storage system and the second system is the photovoltaic system or the power output system, the output power of the energy storage system may be preferentially adjusted and continuously increased.

During the process of increasing the output power of the energy storage system, when the total power required for the stable operation of load can be satisfied before the energy storage system reaches its maximum output power, the increase in the output power of the energy storage system may be stopped.

The new output power of the target system may be obtained based on the increased output power of the energy storage system.

In response to the new output power of the target system being greater than or equal to the total power, the output power of the photovoltaic system and the power output system may be maintained unchanged, allowing the target system to operate based on the new output power of the target system.

In response to the output power of the energy storage system being increased to the maximum output power and the new output power of the target system being still smaller than the total power, the output power of one or more of the photovoltaic system and the power output system (i.e., the second system and the third system) may be further increased until the new output power of the target system is greater than or equal to the total power, allowing the new output power of the target system to satisfy the total power required for the stable operation of the load.

For example, in the actual implementation, when the target system includes the photovoltaic system, the energy storage system, and the power output system, and the first system is the power output system and the second system is the photovoltaic system or the energy storage system, the output power of the power output system may be preferentially adjusted and continuously increased.

During the process of increasing the output power of the power output system, when the total power required for the stable operation of the load can be satisfied before the power output system reaches its maximum output power, the increase in the output power of the power output system may be stopped.

The new output power of the target system may be obtained based on the increased output power of the power output system.

In response to the new output power of the target system being greater than or equal to the total power, the output power of the photovoltaic system and the energy storage system may be maintained unchanged, allowing the target system to operate based on the new output power of the target system.

In response to the output power of the power output system being increased to the maximum output power of the power output system and the new output power of the target system being still smaller than the total power, the output power of one or more of the photovoltaic system and the energy storage system (i.e., the second system and the third system) may be further increased until the new output power of the target system is greater than or equal to the total power, allowing the new output power of the target system to satisfy the total power required for the stable operation of the load.

In the actual implementation, the relationship between the new output power of the target system and the total power can be used to determine whether to continue to adjust the output power of the target system.

In the adjustment method for the inverter system provided in the embodiments of the present disclosure, the output power of the first system is increased to obtain the new output power of the target system, and then it is determined whether the new output power of the target system can satisfy the total power required by the at least one load. When the new output power of the target system does not satisfy the total power required by the at least one load, the output power of the second system and the third system is further increased to increase the output power of the target system. The output power of the target system is flexibly adjusted based on the operation priority, thereby improving the energy utilization rate and reducing the energy waste.

In some embodiments, increasing at least one of the output power of the second system and the output power of the third system may further include: increasing the output power of the second system and obtaining the new output power of the target system; maintaining the output power of the third system unchanged in response to the new output power of the target system being greater than or equal to the total power; and increasing the output power of the third system in response to the output power of the first system being adjusted to the maximum output power of the first system, the output power of the second system being adjusted to the maximum output power of the second system, and the new output power of the target system being still smaller than the total power.

In this embodiment, in the actual implementation, after the output power of the second system is increased, in response to the obtained new output power of the target system being greater than or equal to the total power, it indicates that after the output power of the first system and the second system are adjusted, the new output power of the target system may satisfy the total power required for the stable operation of the at least one load. At this time, the target system may operate based on the new output power of the target system.

In the actual implementation, when the output power of the target system, which is obtained by increasing the output power of the first system to the maximum output power of the first system and the output power of the second system to the maximum output power of the second system, still cannot satisfy the total power required for the stable operation of the at least one load, the output power of the third system may be further increased.

In response to the first system being the photovoltaic system, the second system being the energy storage system, the third system being the power output system, and the new output power of the target system being smaller than the total power, the output power of the power output system may be further increased until the new output power of the target system is greater than or equal to the total power.

In response to the first system being the photovoltaic system, the second system being the power output system, the third system being the energy storage system, and the new output power of the target system being smaller than the total power, the output power of the energy storage system may be further increased until the new output power of the target system is greater than or equal to the total power.

In response to the first system being the energy storage system, the second system being the power output system, the third system being the photovoltaic system, and the new output power of the target system being smaller than the total power, the output power of the photovoltaic system may be further increased until the new output power of the target system is greater than or equal to the total power.

In response to the first system being the energy storage system, the second system being the photovoltaic system, the third system being the power output system, and the new output power of the target system being smaller than the total power, the output power of the power output system may be further increased until the new output power of the target system is greater than or equal to the total power.

In response to the first system being the power output system, the second system being the energy storage system, the third system being the photovoltaic system, and the new output power of the target system being smaller than the total power, the output power of the photovoltaic system may be further increased until the new output power of the target system is greater than or equal to the total power.

In response to the first system being the power output system, the second system being the photovoltaic system, the third system being the energy storage system, and the new output power of the target system being smaller than the total power, the output power of the energy storage system may be further increased until the new output power of the target system is greater than or equal to the total power.

For example, in response to the target system including the photovoltaic system, the energy storage system, and the power output system, and the first system being the photovoltaic system, the second system being the energy storage system, and the third system being the power output system, the output power of the photovoltaic system is preferentially adjusted to the maximum output power of the photovoltaic system, and the new output power of the target system is obtained.

In response to the new output power of the target system being smaller than the total power, the output power of the energy storage system is further increased.

In response to the new output power of the target system being calculated based on the maximum output power of the photovoltaic system and the maximum output power of the energy storage system and being smaller than the total power, the output power of the power output system is further increased until the new output power of the target system satisfies the total power required for the stable operation of the at least one load.

Thirdly, when the target system includes the photovoltaic system and one of the energy storage system and the power output system, the adjustment is performed based on the operation priority.

In some embodiments, adjusting the output power of the at least one of the photovoltaic system, the energy storage system, and the power output system that are included in the target system based on the operation priority may include: when the target system includes the photovoltaic system and the at least one of the energy storage system and the power output system, increasing the output power of the first system with the highest priority among the photovoltaic system, the energy storage system, and the power output system;

obtaining the new output power of the target system; and controlling the output power of the second system based on the new output power of the target system and the total power.

In this embodiment, as shown in FIG. 8, when the target system includes the photovoltaic system and the energy storage system, and the first system is the photovoltaic system, the second system is the energy storage system, and the output power of the photovoltaic system is increased preferentially.

The new output power of the target system is obtained based on the increased output power of the photovoltaic system.

Based on the relationship between the new output power of the target system and the total power, it can be determined whether it is necessary to further increase the output power of the energy storage system.

When the target system includes the photovoltaic system and the energy storage system, and the first system is the energy storage system, the second system is the photovoltaic system, and the output power of the energy storage system is increased preferentially.

The new output power of the target system is obtained based on the increased output power of the energy storage system.

Based on the relationship between the new output power of the target system and the total power, it can be determined whether it is necessary to further increase the output power of the photovoltaic system.

When the target system includes the photovoltaic system and the power output system, and the first system is the photovoltaic system, the second system is the power output system, and the output power of the photovoltaic system is increased preferentially.

The new output power of the target system is obtained based on the increased output power of the photovoltaic system.

Based on the relationship between the new output power of the target system and the total power, it can be determined whether it is necessary to further increase the output power of the power output system.

Figure 9:
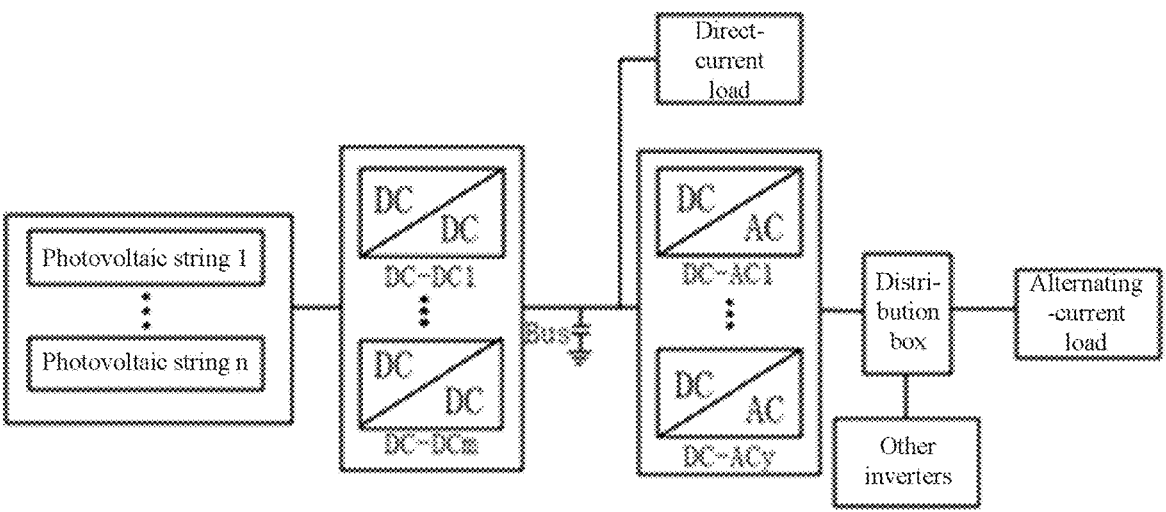
FIG. 9 is a sixth principle schematic diagram of a detection method for an inverter system provided according to an embodiment of the present disclosure.

As shown in FIG. 9, the power output system may be other inverters.

Figure 10:
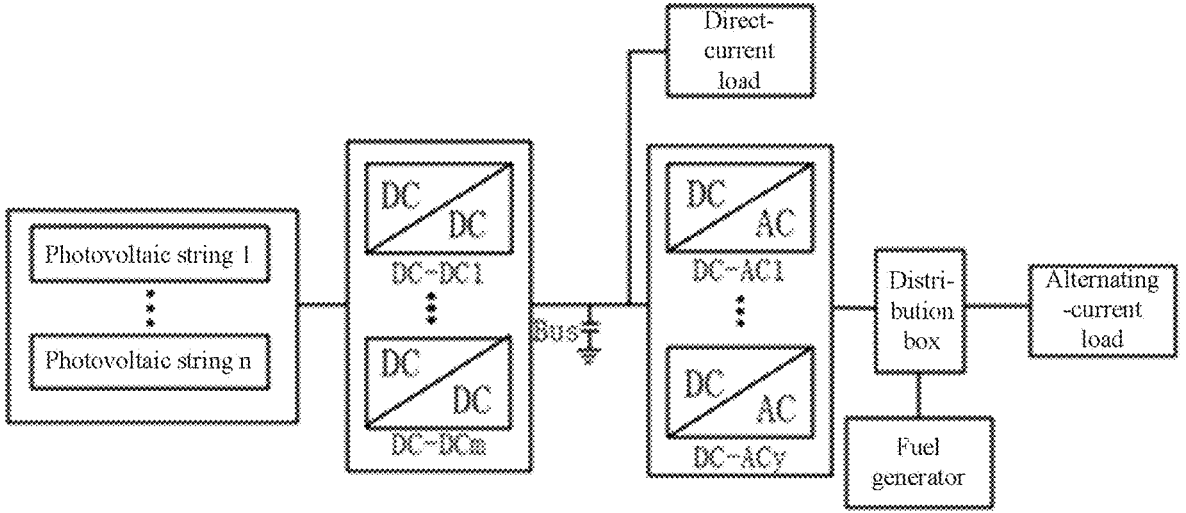
FIG. 10 is a seventh principle schematic diagram of a detection method for an inverter system provided according to an embodiment of the present disclosure.

As shown in FIG. 10, the power output system may be a fuel generator.

As shown in FIG. 13, the power output system may also include other inverters and the fuel generator. When the target system includes the photovoltaic system and the power output system, and the first system is the power output system, the second system is the photovoltaic system, and the output power of the power output system is increased preferentially. The new output power of the target system is obtained based on the increased output power of the power output system.

Based on the relationship between the new output power of the target system and the total power, it can be determined whether it is necessary to further increase the output power of the photovoltaic system.

According to the detection method for the inverter system provided in the embodiments of the present disclosure, by increasing the output power of each power supply system in the target system based on the operation priority, the output power of the target system is flexibly adjusted to satisfy the power required for the stable operation of the at least one load, which can reduce the energy waste, improve the energy utilization rate, and reduce the cost.

In some embodiments, controlling the output power of the second system based on the new output power of the target system and the total power may include: maintaining the output power of the second system unchanged in response to the new output power of the target system being greater than or equal to the total power; and increasing the output power of the second system in response to the output power of the first system being adjusted to the maximum output power of the first system and the new output power of the target system being smaller than the total power.

In this embodiment, when the new output power of the target system is greater than or equal to the total power, it indicates that after the output power of the first system is increased, the new output power of the target system may satisfy the total power required for the stable operation of the at least one load. At this time, the target system may operate based on the new output power of the target system.

When the output power of the first system is increased to the maximum output power of the first system and the new output power of the target system is smaller than the total power, it indicates that after the output power of the first system is increased to the maximum output power of the first system, the new output power of the target system still cannot satisfy the total power required for the stable operation of the at least one load. At this time, the output power of the second system may be further increased.

When the target system includes the photovoltaic system and the power output system, and the first system is the photovoltaic system, the second system is the power output system. In response to the new output power of the target system obtained by increasing the output power of the photovoltaic system to the maximum output power of the photovoltaic system being smaller than the total power, the output power of the power output system is further increased until the new output power of the target system is greater than or equal to the total power.

When the target system includes the photovoltaic system and the power output system, and the first system is the power output system, the second system is the photovoltaic system. In response to the new output power of the target system obtained by increasing the output power of the power output system to the maximum output power of the power output system being smaller than the total power, the output power of the photovoltaic system is further increased until the new output power of the target system is greater than or equal to the total power.

When the target system includes the photovoltaic system and the energy storage system, and the first system is the photovoltaic system, the second system is the energy storage system. In response to the new output power of the target system obtained by increasing the output power of the photovoltaic system to the maximum output power of the photovoltaic system being smaller than the total power, the output power of the energy storage system is further increased until the new output power of the target system is greater than or equal to the total power.

When the target system includes the photovoltaic system and the energy storage system, and the first system is the energy storage system, the second system is the photovoltaic system. In response to the new output power of the target system obtained by increasing the output power of the energy storage system to the maximum output power of the energy storage system being smaller than the total power, the output power of the photovoltaic system is further increased until the new output power of the target system is greater than or equal to the total power.

According to the detection method for the inverter system provided in the embodiments of the present disclosure, by determining the relationship between the new output power of the target system and the total power, it is determined whether to continue to increase the output power of the target system. The output power of the target system is flexibly adjusted based on the actual application scenario, reducing the energy waste, improving the energy utilization rate, and reducing the cost.

Fourthly, the target system includes the photovoltaic system and performs the adjustment based on the operation priority.

Figure 11:
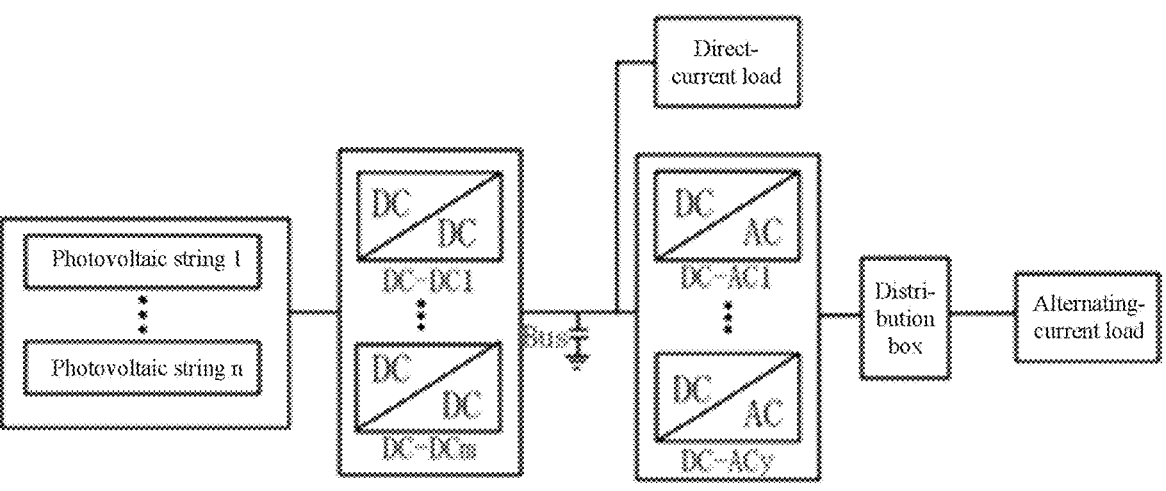
FIG. 11 is an eighth principle schematic diagram of a detection method for an inverter system provided according to an embodiment of the present disclosure.

As shown in FIG. 11, in some embodiments, adjusting the output power of at least one of the photovoltaic system, the energy storage system, and the power output system that are included in the target system may include: increasing the output power of the photovoltaic system when the target system includes the photovoltaic system.

In this embodiment, in the actual implementation, the output power of the photovoltaic system may be gradually increased. Based on the increased output power of the photovoltaic system, the new output power of the target system is determined, allowing the new output power of the target system to satisfy the power required for the stable operation of the at least one load.

According to the detection method for the inverter system provided in the embodiments of the present disclosure, by gradually increasing the output power of the photovoltaic system, the output power of the target system is effectively increased, allowing the new output power of the target system to support the stable operation of the at least one load, and improving safety of subsequent arc detection.

In some embodiments, the performing the arc detection on the faulty photovoltaic string in the photovoltaic system includes: lowering an output electrical signal of at least part of photovoltaic strings in the at least one photovoltaic string included in the photovoltaic system, to perform the arc detection on the faulty photovoltaic string in the photovoltaic system.

In this embodiment, the electrical signal may be a current, a voltage, power, and other signals.

The output electrical signal may be an output current.

A lowering magnitude of the output electrical signal may be user-defined or determined based on the actual situation. For example, the output electrical signal may be lowered to 0 or 1, or be lowered by 10 or 15 from a current value of the output electrical signal, which is not limited in the present disclosure.

In the actual implementation, after the output power of the target system is adjusted to ensure that each load may operate stably, the output electrical signal of the at least part of photovoltaic strings may be lowered. Based on the actual situation of the lowered output electrical signal, it can be determined whether an arc is generated in the faulty photovoltaic string.

According to the detection method for the inverter system provided in the embodiments of the present disclosure, by lowering the output electrical signal of the faulty photovoltaic string or lowering the output electrical signal of the faulty photovoltaic string and an output electrical signal of the photovoltaic string within the target range around the faulty photovoltaic string, based on the actual situation of the lowered output electrical signal, it can be determined whether an arc is generated in the faulty photovoltaic string. The control logic is simple and easy to operate.

In some embodiments, the lowering the output electrical signal of the at least part of photovoltaic strings in the at least one photovoltaic string included in the photovoltaic system, to perform the arc detection on the faulty photovoltaic string in the photovoltaic system may include: collecting, in response to the output electrical signal of the at least part of photovoltaic strings being lowered, a lowered output electrical signal; subsequent to obtaining the lowered output electrical signal, raising the output electrical signal of the at least part of photovoltaic strings and collecting the raised output electrical signal; determining that no arc is generated in the faulty photovoltaic string in response to the raised output electrical signal being greater than or equal to the lowered output electrical signal or the raised output electrical signal being greater than or equal to an electrical signal threshold; and determining that an arc is generated in the faulty photovoltaic string in response to the raised output electrical signal being smaller than the lowered output electrical signal and/or the raised output electrical signal being smaller than the electrical signal threshold.

In this embodiment, the electrical signal threshold is a predetermined value for determining whether an arc is generated in the faulty photovoltaic string.

A specific value of the electrical signal threshold may be user-defined or determined based on the actual situation, which is not limited in the present disclosure.

In the actual implementation, after the output electrical signal of the at least part of photovoltaic strings is lowered, the lowered output electrical signal is collected, i.e., the lowered output electrical signal is obtained. After the lowered output electrical signal is obtained, the output electrical signal is raised, and the raised output electrical signal is collected, to obtain the raised output electrical signal.

Based on a relationship between the lowered output electrical signal and the raised output electrical signal, it is determined whether the arc is generated in the faulty photovoltaic string to reduce a misdetection probability.

In some embodiments, it is determined that no arc is generated in the faulty photovoltaic string in response to the raised output electrical signal being greater than or equal to the lowered output electrical signal.

In response to the raised output electrical signal being smaller than the lowered output electrical signal, it is determined that an arc is generated in the faulty photovoltaic string.

In other embodiments, in response to the raised output electrical signal being greater than or equal to the electrical signal threshold, it is determined that no arc is generated in the faulty photovoltaic string;

In response to the raised output electrical signal being smaller than the electrical signal threshold, it is determined that an arc is generated in the faulty photovoltaic string.

For example, the output electrical signal may be lowered to 1, and then the output electrical signal may be raised.

When the output electrical signal can be raised (i.e., the raised output electrical signal is greater than or equal to 1), it indicates that no arc is generated in a connection line between the faulty photovoltaic string and the inverter system, and the faulty photovoltaic string is mis-detected.

When the output electrical signal cannot be raised, it indicates that an arc is generated in the connection line between the faulty photovoltaic string and the inverter system, and an arc detection result of the faulty photovoltaic string is correct.

According to the detection method for the inverter system provided in the embodiments of the present disclosure, by obtaining the lowered output electrical signal, then raising the output electrical signal, and comparing the raised output electrical signal with the lowered output electrical signal or the electrical signal threshold, to determine whether the faulty photovoltaic string is mis-detected. This reduces the occurrence of misdetection of the faulty photovoltaic string, improves the detection accuracy, and timely detects faults in the inverter system to improve the safety of the inverter system.

The execution subject of the detection method for the inverter system provided in the embodiments of the present disclosure may be the detection apparatus for the inverter system. In the embodiments of the present disclosure, as an example, the detection apparatus for the inverter system executes the detection method for the inverter system, the detection apparatus for the inverter system provided in the embodiments of the present disclosure is described.

The embodiments of the present disclosure also provide a detection apparatus for an inverter system.

The inverter system is electrically connected to a photovoltaic system and at least one load.

The photovoltaic system includes at least one photovoltaic string.

Figures 14, 15:
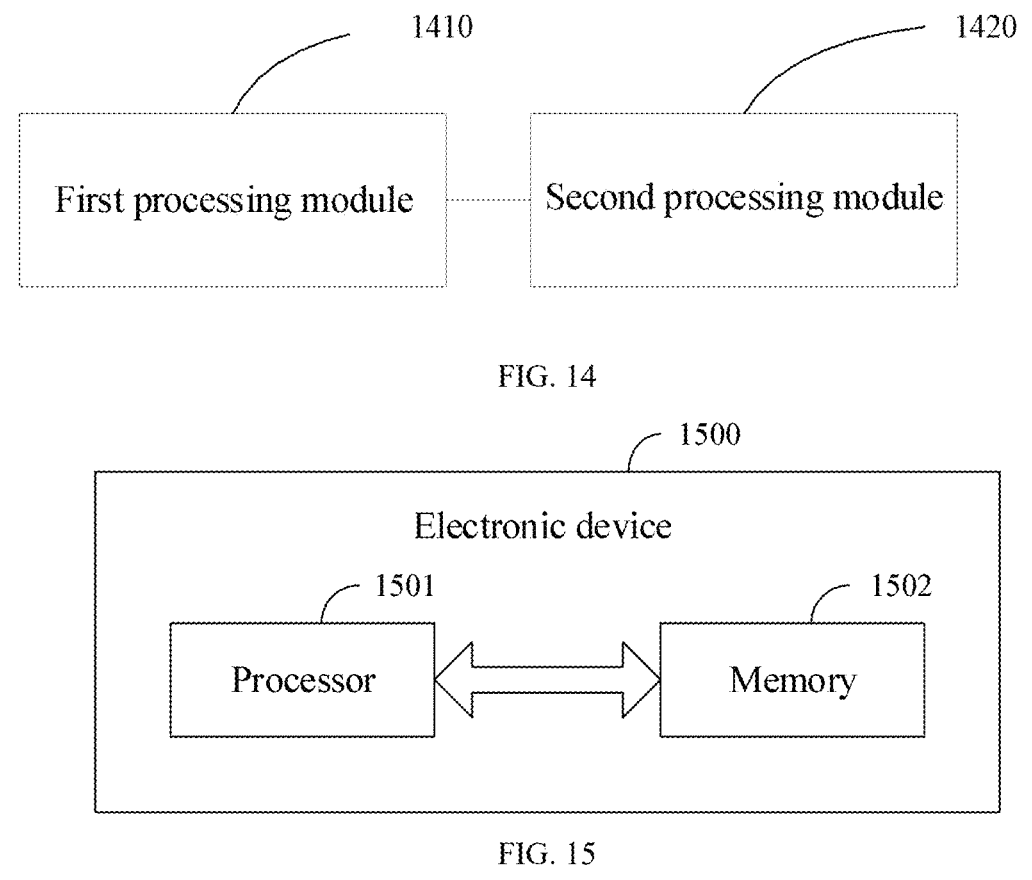

As shown in FIG. 14, the detection apparatus for the inverter system includes: a first processing module 1410 and a second processing module 1420.

The first processing module 1410 is configured to obtain output power corresponding to a target system connected to the at least one load. The target system is configured to supply power to the at least one load. The target system includes the photovoltaic system.

The second processing module 1420 is configured to perform arc detection on a faulty photovoltaic string in the photovoltaic system based on the output power and total power corresponding to the at least one load.

According to the detection apparatus for the inverter system provided in the embodiments of the present disclosure, the output power of the target system that supplies power to the at least one load is obtained, and the arc detection is performed based on the output power and the total power corresponding to the at least one load, which ensures stability of load operation during the arc detection process, mitigates an impact of the reduction of the output power of the inverter system on the load operation, improves load performance and prolongs service life of the load, reduces safety hazards caused by unstable operation of the load, and improves the user experience.

In some embodiments, the second processing module 1420 may further be configured to: perform the arc detection on the faulty photovoltaic string in the photovoltaic system in response to the output power corresponding to the target system being greater than or equal to the total power.

In some embodiments, the second processing module 1420 may further be configured to: disconnect a non-critical load in the at least one load in response to the output power corresponding to the target system being smaller than the total power, where the non-critical load is predetermined; and perform the arc detection on the faulty photovoltaic string in the photovoltaic system in response to the output power corresponding to the target system being greater than or equal to total power corresponding to critical load in the at least one load excluding the non-critical load.

In some embodiments, the non-critical load include: at least one of a non-critical load on a direct-current side and a non-critical load on an alternating-current side. The second processing module 1420 may further be configured to: disconnect the non-critical load in the at least one load based on a disconnection priority corresponding to the non-critical load on the direct-current side and a disconnection priority corresponding to the non-critical load on the alternating-current side, until the output power corresponding to the target system is greater than or equal to new total power.

In some embodiments, there are a plurality of non-critical loads on each of the direct-current side and the alternating-current side, the second processing module 1420 may further be configured to: sequentially disconnect the non-critical loads on a target side with a higher disconnection priority among the non-critical loads on the direct-current side and the non-critical loads on the alternating-current side, and obtaining new total power; stop, in response to the output power corresponding to the target system being greater than or equal to the new total power, the disconnection operation; and sequentially disconnect, in response to all loads on the target side being disconnected and the output power corresponding to the target system being smaller than the new total power, the non-critical loads on the other side other than the target side, until the output power corresponding to the target system is greater than or equal to the new total power.

In some embodiments, the second processing module 1420 may further be configured to: disconnect, when the target system includes a photovoltaic system and at least one of an energy storage system and a power output system, and the photovoltaic system includes one of the at least one photovoltaic string, the non-critical load in the at least one load based on the disconnection priority.

In some embodiments, the second processing module 1420 may further be configured to: disconnect, when the target system includes the photovoltaic system and the photovoltaic system includes a plurality of photovoltaic strings, the non-critical load in the at least one load based on the disconnection priority.

In some embodiments, the second processing module 1420 may further be configured to: adjust output power of at least one of the photovoltaic system, an energy storage system, and a power output system that are included in the target system based on an operation priority; and perform the arc detection on the faulty photovoltaic string in the photovoltaic system.

In some embodiments, the second processing module 1420 may further be configured to: increase output power of a first system with the highest priority among the energy storage system and the power output system when the target system includes the photovoltaic system, the energy storage system, and the power output system, and the photovoltaic system is not allowed to output power; obtain new output power of the target system; and control output power of a second system based on the new output power of the target system and the total power. The second system is a system other than the first system among the energy storage system and the power output system.

In some embodiments, the second processing module 1420 may further be configured to: maintain the output power of the second system unchanged in response to the new output power of the target system being greater than or equal to the total power; and increase the output power of the second system in response to the output power of the first system being adjusted to maximum output power of the first system and the new output power of the target system being smaller than the total power.

In some embodiments, the second processing module 1420 may further be configured to: lower an output electrical signal of at least part of photovoltaic strings in the at least one photovoltaic string included in the photovoltaic system, to perform the arc detection on the faulty photovoltaic string in the photovoltaic system.

In some embodiments, the second processing module 1420 may further be configured to: collect, in response to the output electrical signal of the at least part of photovoltaic strings being lowered, a lowered output electrical signal; subsequent to obtaining the lowered output electrical signal, raise the output electrical signal of the at least part of photovoltaic strings and collect the raised output electrical signal; determine that no arc is generated in the faulty photovoltaic string in response to the raised output electrical signal being greater than or equal to the lowered output electrical signal or the raised output electrical signal being greater than or equal to an electrical signal threshold; and determine that an arc is generated in the faulty photovoltaic string in response to the raised output electrical signal being smaller than the lowered output electrical signal and/or the raised output electrical signal being smaller than the electrical signal threshold.

The detection apparatus for the inverter system in the embodiments of the present disclosure may be an inverter system, or may be an electronic device in a communication connection with the inverter system, or a component in the inverter system or the electronic device, such as an integrated circuit or a chip. The electronic device may be a terminal or a device other than the terminal. Exemplarily, the electronic device may be a mobile phone, a tablet computer, a laptop computer, a handheld computer, an in-vehicle electronic device, a mobile internet device (MID), an augmented reality (AR)/virtual reality (VR) device, a robot, a wearable device, an ultra-mobile personal computer (UMPC), a netbook or a personal digital assistant (PDA), or the like. The electronic device may also be a server, a network attached storage (NAS), a personal computer (PC), a television (TV), a teller machine, a self-service machine, or the like, and the embodiments of the present disclosure do not specifically limit this.

The detection apparatus for the inverter system in the embodiments of the present disclosure may be an apparatus having an operation system. The operation system may be an Android operation system, an IOS operation system, or other possible operation systems, and the embodiments of the present disclosure do not specifically limit this.

The detection apparatus for the inverter system provided according to the embodiments of the present disclosure may realize various processes implemented by method embodiments of FIG. 1 to FIG. 13, and details are omitted herein for the avoidance of repetition.

The embodiments of the present disclosure also provide an inverter system.

In some embodiments, the inverter system is configured to perform detection based on the detection method for the inverter system as described in any one of the above embodiments.

According to the inverter system provided in the embodiments of the present disclosure, the output power of the target system that supplies power to the at least one load is obtained, and the arc detection is performed based on the output power and the total power corresponding to each load, which ensures stability of load operation during the arc detection process, mitigates an impact of the reduction of the output power of the inverter system on the load operation, improves load performance and prolongs service life of the load, reduces safety hazards caused by unstable operation of the load, and improves the user experience.

In some embodiments, as shown in FIG. 15, the embodiments of the present disclosure further provide an electronic device 1500. The electronic device 1500 includes a processor 1501, a memory 1502, and a computer program stored on the memory 1502 and executable on the processor 1501. When executed by the processor 1501, the program implements various processes of the embodiments of the detection method for the inverter system as described above and may achieve the same technical effect. For the avoidance of repetition, details are omitted herein.

It should be noted that the electronic device in the embodiments of the present disclosure includes a mobile electronic device and a non-mobile electronic device as described above.

The embodiments of the present disclosure further provide a non-transitory computer-readable storage medium having a computer program stored thereon. The computer program, when executed by the processor, implements various processes of the embodiments of the detection method for the inverter system as described above and may achieve the same technical effect. For the avoidance of repetition, details are omitted herein.

The processor is a processor in the electronic device as described in the above embodiments. The readable storage medium includes a computer-readable storage medium, such as a computer read-only memory ROM, a random access memory RAM, and a magnetic disk or an optical disk.

The embodiments of the present disclosure further provide a computer program product, including a computer program. The computer program, when executed by the processor, implements the detection method for the inverter system as described above.

The processor is the processor in the electronic device as described in the above embodiments. The readable storage medium includes a computer-readable storage medium, such as a computer read-only memory ROM, a random access memory RAM, and a magnetic disk or an optical disk.

The embodiments of the present disclosure further provide a chip. The chip includes a processor and a communication interface. The communication interface is coupled to the processor. The processor is used for running a program or an instruction. In this way, various processes of the embodiments of the detection method for the inverter system as described above are realized, and the same technical effect can be achieved. For the avoidance of repetition, details are omitted herein.

It should be understood that the chip mentioned in the embodiments of the present disclosure may also be referred to as a system-level chip, a system chip, a chip system or a system-on-chip, or the like.

It should be noted that, terms herein "comprise", "include" or any other variations thereof are meant to cover non-exclusive including, such that the process, method, article or device including a series of elements do not only include those elements, but also include other elements that are not explicitly listed, or also include inherent elements of the process, method, article or device. In a case that there are no more restrictions, an element qualified by the statement "comprises a . . . " does not exclude the presence of additional identical elements in the process, method, article or device that includes the said element. In addition, it should be noted that the scope of the methods and devices in the implementations of the present disclosure are not limited to performing the functions in the order shown or discussed, and may also include performing the functions in a substantially simultaneous manner or in a reverse order according to the involved functions. For example, the described methods may be performed in an order different from the described order, and various steps may be added, omitted, or combined. In addition, features described with reference to some examples may be combined in other examples.

From the above description of the implementations, those skilled in the art may clearly understand that the methods of the above embodiments can be implemented by software and a necessary general hardware platform. Of course, the method can also be implemented by hardware, but the former is a preferred implementation in many cases. Based on such understanding, the technical solutions of the present disclosure essentially, or the part contributing to the related art may be embodied in a form of a software product. The computer software product is stored in a storage medium (such as ROM/RAM, a magnetic disk, and an optical disc), and includes several instructions for allowing a terminal (which may be a mobile phone, a computer, a server, or a network device) to execute methods described in the embodiments of the present disclosure.

The embodiments of the present disclosure have been described above with reference to the accompanying drawings, but the present disclosure is not limited to the above-described specific implementations, which are merely schematic and not restrictive, and those skilled in the art can make many forms under the inspiration of the present disclosure without departing from the purpose of the present disclosure and the scope of the claims, all of which fall within the protection of the present disclosure.

In the description of this specification, descriptions with reference to the terms "an embodiment", "some embodiments", "schematic embodiments", "examples", "specific examples", or "some examples", etc. mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner.

Although the embodiments of the present disclosure have been shown and described above, it can be understood by those skilled in the art that various changes, modifications, replacements, and variations can be made to these embodiments without departing from the principles and ideas of the present disclosure. The scope of the present disclosure is defined by the claims as attached and their equivalents.

What is claimed is:

1. A detection method for an inverter system, wherein the inverter system is electrically connected to a photovoltaic system and at least one load, the photovoltaic system comprising at least one photovoltaic string; and the method comprises:

obtaining maximum output power corresponding to a target system connected to the at least one load, output power that approximates to the maximum output power corresponding to the target system, or user-defined output power, wherein the target system is configured to supply power to the at least one load, and wherein the target system comprises the photovoltaic system; and performing arc detection on a faulty photovoltaic string in the photovoltaic system based on the maximum output power corresponding to the target system, the output power that approximates to the maximum output power corresponding to the target system or the user-defined output power, and total power corresponding to the at least one load, wherein said performing the arc detection on the faulty photovoltaic string in the photovoltaic system based on the maximum output power corresponding to the target system, the output power that approximates to the maximum output power corresponding to the target system or the user-defined output power, and the total power corresponding to the at least one load comprises:

performing, in response to the maximum output power corresponding to the target system, the output power that approximates to the maximum output power corresponding to the target system, or the user-defined output power being greater than or equal to the total power corresponding to the at least one load, the arc detection on the faulty photovoltaic string in the photovoltaic system; or disconnecting, in response to the maximum output power corresponding to the target system, the output power that approximates to the maximum output power corresponding to the target system, or the user-defined output power being smaller than the total power, a non-critical load in the at least one load, wherein the non-critical load is predetermined; and performing, in response to the maximum output power corresponding to the target system, the output power that approximates to the maximum output power corresponding to the target system, or the user-defined output power being greater than or equal to total power corresponding to a critical load in the at least one load excluding the non-critical load, the arc detection on the faulty photovoltaic string in the photovoltaic system.

2. The detection method according to claim 1, wherein when the target system further comprises at least one of an energy storage system and a power output system, the maximum output power corresponding to the target system, the output power that approximates to the maximum output power corresponding to the target system, or the user-defined output power is a sum of maximum output power corresponding to the photovoltaic system and at least one of maximum output power corresponding to the energy storage system and maximum output power corresponding to the power output system.

3. The detection method according to claim 1, wherein: when the target system is the photovoltaic system and the photovoltaic system comprises a plurality of photovoltaic strings, the maximum output power corresponding to the target system, the output power that approximates to the maximum output power corresponding to the target system, or the user-defined output power is a sum of maximum output power corresponding to a first part of photovoltaic strings in the plurality of photovoltaic strings comprised in the photovoltaic system, wherein the first part of photovoltaic strings are remaining photovoltaic strings among the plurality of photovoltaic strings excluding at least part of photovoltaic strings, the at least part of photovoltaic strings comprising the faulty photovoltaic string.

4. The detection method according to claim 3, wherein the at least part of photovoltaic strings comprise the faulty photovoltaic string and at least one photovoltaic string located within a target range around the faulty photovoltaic string.

5. The detection method according to claim 1, wherein: the non-critical load comprises at least one of a non-critical load on a direct-current side and a non-critical load on an alternating-current side; and said disconnecting the non-critical load in the at least one load comprises:

disconnecting the non-critical load in the at least one load based on a disconnection priority corresponding to the non-critical load on the direct-current side and a disconnection priority corresponding to the non-critical load on the alternating-current side, until the maximum output power corresponding to the target system, the output power that approximates to the maximum output power corresponding to the target system, or the user-defined output power is greater than or equal to new total power.

6. The detection method according to claim 5, wherein there are a plurality of non-critical loads on each of the direct-current side and the alternating-current side, said disconnecting the non-critical load in the at least one load based on the disconnection priority corresponding to the non-critical load on the direct-current side and the disconnection priority corresponding to the non-critical load on the alternating-current side, until the maximum output power corresponding to the target system, the output power that approximates to the maximum output power corresponding to the target system, or the user-defined output power is greater than or equal to the new total power comprises:

sequentially disconnecting the non-critical loads on a target side with a higher disconnection priority among the non-critical loads on the direct-current side and the non-critical loads on the alternating-current side, and obtaining new total power;

stopping, in response to the maximum output power corresponding to the target system, the output power that approximates to the maximum output power corresponding to the target system, or the user-defined output power being greater than or equal to the new total power, the disconnection operation; and sequentially disconnecting, in response to all the non-critical loads on the target side being disconnected and the maximum output power corresponding to the target system, the output power that approximates to the maximum output power corresponding to the target system, or the user-defined output power being still smaller than the new total power, the non-critical loads on the other side other than the target side, until the maximum output power corresponding to the target system, the output power that approximates to the maximum output power corresponding to the target system, or the user-defined output power is greater than or equal to the new total power.

7. The detection method according to claim 5, wherein said disconnecting the non-critical load in the at least one load based on the disconnection priority corresponding to the non-critical load on the direct-current side and the disconnection priority corresponding to the non-critical load on the alternating-current side comprises:

disconnecting, when the target system comprises the photovoltaic system and at least one of an energy storage system and a power output system and the photovoltaic system comprises one of the at least one photovoltaic string, the non-critical load in the at least one load based on the disconnection priority.

8. The detection method according to claim 5, wherein said disconnecting the non-critical load in the at least one load based on the disconnection priority corresponding to the non-critical load on the direct-current side and the disconnection priority corresponding to the non-critical load on the alternating-current side comprises:

disconnecting, when the target system comprises the photovoltaic system and the photovoltaic system comprises a plurality of photovoltaic strings, the non-critical load in the at least one load based on the disconnection priority.

9. The detection method according to claim 1, wherein said performing the arc detection on the faulty photovoltaic string in the photovoltaic system comprises:

adjusting output power of at least one of the photovoltaic system, an energy storage system, and a power output system that are comprised in the target system based on an operation priority; and performing the arc detection on the faulty photovoltaic string in the photovoltaic system in response to the adjusted target system allowing for stable operation of the at least one load.

10. The detection method according to claim 9, wherein said adjusting the output power of the at least one of the photovoltaic system, the energy storage system, and the power output system that are comprised in the target system based on the operation priority comprises:

increasing, when the target system comprises the photovoltaic system, the energy storage system, and the power output system, and the photovoltaic system is not allowed to output power, output power of a first system with the highest priority among the energy storage system and the power output system;

obtaining new output power of the target system; and controlling output power of a second system based on the new output power of the target system and the total power, wherein the second system is a system other than the first system among the energy storage system and the power output system.

11. The detection method according to claim 10, wherein said controlling the output power of the second system based on the new output power of the target system and the total power comprises:

maintaining the output power of the second system unchanged in response to the new output power of the target system being greater than or equal to the total power; and increasing the output power of the second system in response to the output power of the first system being adjusted to maximum output power of the first system and the new output power of the target system being smaller than the total power.

12. The detection method according to claim 9, wherein said performing the arc detection on the faulty photovoltaic string in the photovoltaic system comprises:

lowering an output electrical signal of at least part of photovoltaic strings in the at least one photovoltaic string comprised in the photovoltaic system, to perform the arc detection on the faulty photovoltaic string in the photovoltaic system.

13. The detection method according to claim 12, wherein said lowering the output electrical signal of the at least part of photovoltaic strings in the at least one photovoltaic string comprised in the photovoltaic system, to perform the arc detection on the faulty photovoltaic string in the photovoltaic system comprises:

collecting, in response to the output electrical signal of the at least part of photovoltaic strings being lowered, a lowered output electrical signal;

subsequent to obtaining the lowered output electrical signal, raising the output electrical signal of the at least part of photovoltaic strings and collecting the raised output electrical signal;

determining that no arc is generated in the faulty photovoltaic string in response to the raised output electrical signal being greater than or equal to the lowered output electrical signal or the raised output electrical signal being greater than or equal to an electrical signal threshold; and determining that an arc is generated in the faulty photovoltaic string in response to the raised output electrical signal being smaller than the lowered output electrical signal and/or the raised output electrical signal being smaller than the electrical signal threshold.

14. An inverter system, wherein the inverter system is configured to perform detection based on the detection method for the inverter system according to claim 1.

15. The inverter system according to claim 14, wherein:

the non-critical load comprises: at least one of a non-critical load on a direct-current side and a non-critical load on an alternating-current side; and said disconnecting the non-critical load in the at least one load comprises:

disconnecting the non-critical load in the at least one load based on a disconnection priority corresponding to the non-critical load on the direct-current side and a disconnection priority corresponding to the non-critical load on the alternating-current side, until the maximum output power corresponding to the target system, the output power that approximates to the maximum output power corresponding to the target system, or the user-defined output power is greater than or equal to new total power.

16. The inverter system according to claim 15, wherein there are a plurality of non-critical loads on each of the direct-current side and the alternating-current side, said disconnecting the non-critical load in the at least one load based on the disconnection priority corresponding to the non-critical load on the direct-current side and the disconnection priority corresponding to the non-critical load on the alternating-current side, until the maximum output power corresponding to the target system, the output power that approximates to the maximum output power corresponding to the target system, or the user-defined output power is greater than or equal to the new total power comprises:

sequentially disconnecting the non-critical loads on a target side with a higher disconnection priority among the non-critical loads on the direct-current side and the non-critical loads on the alternating-current side, and obtaining new total power;

stopping, in response to the maximum output power corresponding to the target system, the output power that approximates to the maximum output power corresponding to the target system, or the user-defined output power being greater than or equal to the new total power, the disconnection operation; and sequentially disconnecting, in response to all the non-critical loads on the target side being disconnected and the maximum output power corresponding to the target system, the output power that approximates to the maximum output power corresponding to the target system, or the user-defined output power being smaller than the new total power, the non-critical loads on the other side other than the target side, until the maximum output power corresponding to the target system, the output power that approximates to the maximum output power corresponding to the target system, or the user-defined output power is greater than or equal to the new total power.

17. The inverter system according to claim 15, wherein said disconnecting the non-critical load in the at least one load based on the disconnection priority corresponding to the non-critical load on the direct-current side and the disconnection priority corresponding to the non-critical load on the alternating-current side comprises:

disconnecting, when the target system comprises a photovoltaic system and at least one of an energy storage system and a power output system, and the photovoltaic system comprises a photovoltaic string, the non-critical load in the at least one load based on the disconnection priority.

18. A non-transitory computer-readable storage medium, having a computer program stored thereon, wherein the computer program, when executed by a processor, implements the detection method for the inverter system according to claim 1.

19. A computer program product, comprising a computer program, wherein the computer program, when executed by a processor, implements the detection method for the inverter system according to claim 1.

\* \* \* \* \*